US007962356B2

(12) United States Patent
Bollenbeck et al.

(10) Patent No.: US 7,962,356 B2
(45) Date of Patent: Jun. 14, 2011

(54) STAFF SCHEDULING

(75) Inventors: Peter Bollenbeck, Ratingen (DE); Ralf Kemper, Ratingen (DE)

(73) Assignee: InVision Software AG, Ratingen (DE)

( * ) Notice: Subject to any disclaimer, the term of this patent is extended or adjusted under 35 U.S.C. 154(b) by 560 days.

(21) Appl. No.: 11/421,183

(22) Filed: May 31, 2006

(65) Prior Publication Data
US 2006/0277090 A1 Dec. 7, 2006

(30) Foreign Application Priority Data

Jun. 1, 2005 (EP) .................................... 05011856

(51) Int. Cl.
*G06F 9/44* (2006.01)
(52) U.S. Cl. ................. 705/7.13; 705/7.14; 379/265.01; 379/265.05; 379/265.06; 379/265.12
(58) Field of Classification Search .................. None
See application file for complete search history.

(56) References Cited

U.S. PATENT DOCUMENTS

| | | | | | |
|---|---|---|---|---|---|
| 5,216,593 | A | * | 6/1993 | Dietrich et al. ............... | 345/467 |
| 5,289,368 | A | | 2/1994 | Jordan et al. | |
| 5,563,783 | A | * | 10/1996 | Stolfo et al. .................. | 705/8 |
| 5,671,403 | A | * | 9/1997 | Shekita et al. ................ | 707/3 |
| 5,825,869 | A | * | 10/1998 | Brooks et al. ............ | 379/265.12 |
| 5,903,641 | A | * | 5/1999 | Tonisson ................... | 379/265.12 |
| 5,913,199 | A | * | 6/1999 | Dueck et al. .................. | 705/7 |
| 6,044,355 | A | * | 3/2000 | Crockett et al. .................. | 705/8 |
| 6,052,460 | A | * | 4/2000 | Fisher et al. ............. | 379/265.12 |
| 6,088,441 | A | * | 7/2000 | Flockhart et al. ........ | 379/265.12 |
| 6,130,942 | A | * | 10/2000 | Stenlund .................. | 379/265.12 |
| 6,154,705 | A | * | 11/2000 | McCormack et al. .......... | 702/17 |
| 6,163,607 | A | * | 12/2000 | Bogart et al. ............. | 379/266.01 |
| 6,173,053 | B1 | * | 1/2001 | Bogart et al. ............. | 379/266.01 |
| 6,263,065 | B1 | * | 7/2001 | Durinovic-Johri et al. ........................ | 379/266.03 |
| 6,272,544 | B1 | * | 8/2001 | Mullen ......................... | 709/226 |
| 6,278,777 | B1 | * | 8/2001 | Morley et al. ............. | 379/265.02 |
| 6,330,326 | B1 | * | 12/2001 | Whitt ....................... | 379/265.13 |

(Continued)

FOREIGN PATENT DOCUMENTS

EP 1 248 449 9/2002

(Continued)

OTHER PUBLICATIONS

Masin, Michael; Pasaogullari, Melike Oz; Joshi, Sanjay IIE Transactions , 39 , 4 , 395(15) Apr. 2007.*

(Continued)

*Primary Examiner* — Romain Jeanty
*Assistant Examiner* — Brett Feeney
(74) *Attorney, Agent, or Firm* — Fish & Richardson P.C.

(57) ABSTRACT

Methods are provided of creating a deployment plan for staff members with single or multiple qualification for performing activities, each activity requiring at least a single qualification. The methods include the following operations performed by a computer: repeatedly generating a deployment plan assignment of the staff members, and assessing a quality of the assignment generated using a target function, using one of the assignments on the basis of the assessment of the quality as the assignment representing the deployment plan, wherein the target function comprises a term that determines the quality of the assignments, such that the smaller the difference is between the number of the staff members deployed to the activities and the calculated total staff member requirement of the activities the higher the quality of the assignment.

10 Claims, 10 Drawing Sheets

U.S. PATENT DOCUMENTS

| | | | |
|---|---|---|---|
| 6,334,133 B1* | 12/2001 | Thompson et al. | 1/1 |
| 6,337,905 B1* | 1/2002 | Mizuta et al. | 379/265.02 |
| 6,389,400 B1* | 5/2002 | Bushey et al. | 705/7 |
| 6,424,709 B1* | 7/2002 | Doyle et al. | 379/265.02 |
| 6,535,601 B1* | 3/2003 | Flockhart et al. | 379/266.01 |
| 6,553,114 B1* | 4/2003 | Fisher et al. | 379/265.12 |
| 6,563,920 B1* | 5/2003 | Flockhart et al. | 379/265.1 |
| 6,584,191 B1* | 6/2003 | McPartlan et al. | 379/265.02 |
| 6,587,556 B1* | 7/2003 | Judkins et al. | 379/219 |
| 6,628,777 B1 | 9/2003 | McIllwaine et al. | |
| 6,661,889 B1* | 12/2003 | Flockhart et al. | 379/265.05 |
| 6,675,151 B1* | 1/2004 | Thompson et al. | 705/9 |
| 6,711,253 B1* | 3/2004 | Prabhaker | 379/265.01 |
| 6,766,011 B1* | 7/2004 | Fromm | 379/265.01 |
| 6,775,378 B1* | 8/2004 | Villena et al. | 379/266.07 |
| 6,804,345 B1* | 10/2004 | Bala et al. | 379/265.04 |
| 6,822,945 B2* | 11/2004 | Petrovykh | 370/270 |
| 6,832,203 B1* | 12/2004 | Villena et al. | 705/8 |
| 6,842,515 B2* | 1/2005 | Mengshoel et al. | 379/265.02 |
| 6,853,721 B2* | 2/2005 | Mengshoel et al. | 379/265.06 |
| 6,856,680 B2* | 2/2005 | Mengshoel et al. | 379/265.06 |
| 6,865,267 B2* | 3/2005 | Dezonno | 379/265.06 |
| 6,925,165 B2* | 8/2005 | Cohen et al. | 379/265.01 |
| 6,931,119 B2* | 8/2005 | Michelson et al. | 379/265.13 |
| 6,952,732 B2* | 10/2005 | Nourbakhsh et al. | 709/226 |
| 6,970,829 B1* | 11/2005 | Leamon | 705/9 |
| 6,978,006 B1* | 12/2005 | Polcyn | 379/265.12 |
| 7,003,079 B1* | 2/2006 | McCarthy et al. | 379/32.01 |
| 7,035,808 B1* | 4/2006 | Ford | 705/7 |
| 7,058,589 B1* | 6/2006 | Leamon et al. | 705/9 |
| 7,103,562 B2* | 9/2006 | Kosiba et al. | 705/10 |
| 7,133,520 B1* | 11/2006 | Doyle et al. | 379/265.01 |
| 7,155,399 B2* | 12/2006 | Andre et al. | 705/9 |
| 7,158,628 B2* | 1/2007 | McConnell et al. | 379/265.02 |
| 7,170,990 B2* | 1/2007 | Mullen et al. | 379/265.01 |
| 7,184,541 B2* | 2/2007 | Tyagarajan et al. | 379/265.02 |
| 7,200,219 B1* | 4/2007 | Edwards et al. | 379/265.01 |
| 7,249,045 B2* | 7/2007 | Lauffer | 705/8 |
| 7,254,546 B1* | 8/2007 | Andre et al. | 705/9 |
| 7,269,253 B1* | 9/2007 | Wu et al. | 379/265.11 |
| 7,321,657 B2* | 1/2008 | Whitman, Jr. | 379/265.05 |
| 7,343,010 B2* | 3/2008 | Galvin | 379/265.03 |
| 7,366,293 B2* | 4/2008 | Ezerzer et al. | 379/265.1 |
| 7,379,537 B2* | 5/2008 | Bushey et al. | 379/88.01 |
| 7,406,171 B2* | 7/2008 | Whitman, Jr. | 379/265.05 |
| 7,430,519 B2* | 9/2008 | Thompson et al. | 705/9 |
| 7,542,441 B2* | 6/2009 | Choi et al. | 370/328 |
| 7,551,602 B2* | 6/2009 | Whitman, Jr. | 370/352 |
| 7,587,329 B2* | 9/2009 | Thompson et al. | 705/9 |
| 7,657,021 B2* | 2/2010 | Flockhart et al. | 379/266.01 |
| 7,676,034 B1* | 3/2010 | Wu et al. | 379/265.01 |
| 2002/0141561 A1* | 10/2002 | Duncan et al. | 379/220.01 |
| 2003/0061088 A1* | 3/2003 | Sarlay et al. | 705/9 |
| 2003/0081757 A1* | 5/2003 | Mengshoel et al. | 379/265.06 |
| 2003/0095652 A1* | 5/2003 | Mengshoel et al. | 379/265.06 |
| 2003/0169870 A1* | 9/2003 | Stanford | 379/265.12 |
| 2003/0215083 A1* | 11/2003 | McPartlan et al. | 379/265.02 |
| 2004/0052354 A1* | 3/2004 | Crockett | 379/266.03 |
| 2004/0111168 A1* | 6/2004 | Watanabe et al. | 700/28 |
| 2004/0162748 A1* | 8/2004 | Vogel et al. | 705/8 |
| 2004/0162749 A1* | 8/2004 | Vogel et al. | 705/8 |
| 2004/0162753 A1* | 8/2004 | Vogel et al. | 705/10 |
| 2005/0013428 A1* | 1/2005 | Walters | 379/266.08 |
| 2005/0025303 A1* | 2/2005 | Hostetler | 379/265.02 |
| 2005/0043986 A1* | 2/2005 | McConnell et al. | 705/11 |
| 2005/0088976 A1* | 4/2005 | Chafle et al. | 370/252 |
| 2005/0135593 A1* | 6/2005 | Becerra et al. | 379/220.01 |
| 2006/0050702 A1* | 3/2006 | Matsui et al. | 370/392 |

FOREIGN PATENT DOCUMENTS

EP        1248449 A2 * 10/2002

OTHER PUBLICATIONS

Ben-Gal, Irad; Bukchin, Joseph IIE Transactions, 34, 4, 375(17) Apr. 2002.*

Krothapalli, Naga; Deshmukh, Abhijit V. IIE Transactions, 36, 11, 1037(17) Nov. 2004.*

Joseph Berkson (1980). Minimum Chi-Square, Not Maximum Likelihood! The Annals of Statistics. 8(3): 457-487.*

Henn et al. *Organisation von Call Centern* in "Hanbuch Call Center-Management", Chapter 3, pp. 57-77, Chapter 20, pp. 363-392, telepublic Verlag, Hannover, 1st Edition, 1996 (with English abstract).

Cleveland. *How Incoming Call Centers Behave: Back to the Basics.* Parts 1, 2 and 3, CCM Review Article Bundle, ICMI Incoming Calls Management Institute, Part 1 originally published in Apr. 1997, Part 2 original published in May 1997, Part 3 originally published in Jun. 1997.

Borst et al. "Robust algorithms for sharing agents with multiple skills". Bell Labs, Lucent Technologies, Murray Hill, NJ, pp. 1, 5 and 9, 2000.

Henn et al. "Handbuch Call Center Management". Telepublic Verlag, Hannover, 2nd Edition, pp. 204-205, 1998. English Abstract.

Russell et al. "Artificial Intelligence: A modern approach". Prentice Hall, Upper Saddle River, NJ, pp. 111-114 and 619-621, 1995.

* cited by examiner

| QUALIFICATION / QUALIFICATION GROUP | A | B | C | D | NUMBER | PERSONAL NUMBERS |
|---|---|---|---|---|---|---|
| I | X | X | | X | 10 | 1715, 1723, 1712, 1805, 1813, 1919, 1921, 1980, 1728,...... |
| II | | X | | | 15 | 1009, 4700, 2314, 1024,...... |
| III | | | X | X | 13 | 1310, 2100, 1511, 1981, 2102, 2105, 2005, 2300, 2109, 4002,...... |
| IV | X | | X | X | 16 | 2714, 1819, 1712, 4321,...... |

MULTI-ACTIVITY (A, B, C) / NORMAL ACTIVITY (D)

1. ASSIGNMENT:

A, NORMAL ACTIVITY

| QUALIFICATION GROUP \ TIME INTERVAL | | | | |
|---|---|---|---|---|
| I | 1 | 2 | 3 | 4 |
| II | 1 | 2 | 3 | 3 |
| III | 0 | 0 | 0 | 0 |
| IV | 3 | 3 | 3 | 4 |
|  | 0 | 0 | 0 | 0 |
|  | $S_D=4$ | $S_D=5$ | $S_D=6$ | $S_D=7$ |

B, MULTIACTIVITY

{ PROCEDURE DEPENDENT

| QUALIFICATION GROUP \ TIME INTERVAL | | | | |
|---|---|---|---|---|
| I | 1 | 2 | 3 | 4 |
| II | 3 | 4 | 4 | 4 |
| III | 1 | 1 | 1 | 2 |
| IV | 4 | 4 | 5 | 5 |
|  | 0 | 1 | 1 | 1 |
| MANUALLY SCHEDULED (PN) | 1712 | 1712 | 1712 | 1712 |

} PROCEDURE INDEPENDENT

CAPACITIES:

$C_A=4$   $C_A=6$   $C_A=6$   $C_A=6$
$C_B=5$   $C_B=6$   $C_B=6$   $C_B=7$
$C_C=4$   $C_C=5$   $C_C=6$   $C_C=6$
$\overline{BOC_{MA}=9}$   $\overline{BOC_{MA}=11}$   $\overline{BOC_{MA}=12}$   $\overline{BOC_{MA}=13}$

EVALUATION OF TARGET FUNCTION:   $0.290 + 0.168 + 0.111 + 0.163 = 0.732$

2. ASSIGNMENT:

A. NORMAL ACTIVITY

| QUALIFICATION GROUP \ TIME INTERVAL | 1 | 2 | 3 | 4 |
|---|---|---|---|---|
| I | 1 | 2 | 3 | 4 |
| II | 2 | 2 | 3 | 3 |
| III | 0 | 0 | 0 | 0 |
| IV | 3 | 3 | 3 | 4 |
|  | 0 | 0 | 0 | 0 |
|  | $S_D=5$ | $S_D=5$ | $S_D=6$ | $S_D=7$ |

} PROCEDURE DEPENDENT

B. MULTIACTIVITY

| QUALIFICATION GROUP \ TIME INTERVAL | 1 | 2 | 3 | 4 |
|---|---|---|---|---|
| I | 1 | 2 | 3 | 4 |
| II | 2 | 3 | 4 | 4 |
| III | 1 | 1 | 0 | 2 |
| IV | 4 | 4 | 5 | 6 |
|  | 0 | 1 | 1 | 1 |
| MANUALLY SCHEDULED (PN) | 1712 | 1712 | 1712 | 1712 |

} PROCEDURE INDEPENDENT

CAPACITIES:

$C_A=3$  $C_A=5$  $C_A=6$  $C_A=6$
$C_B=4$  $C_B=5$  $C_B=5$  $C_B=7$
$C_C=4$  $C_C=5$  $C_C=6$  $C_C=7$ $\overline{BOC_{174}=8}$  $\overline{BOC_{174}=10}$  $\overline{BOC_{174}=11}$  $\overline{BOC_{174}=14}$

EVALUATION OF TARGET FUNCTION:  0.111 + 0.090 + 0.049 + 0.1069 = 0.357

FIG. 4

DEPLOYMENT PLAN
NORMAL ACTIVITY:

| 1 | 2 | 3 | 4 |
|---|---|---|---|
| 1719 | 1719 | 1719 | 1719 |
| 1723 | 1723 | 1723 | 1723 |
|  |  | 1728 | 1728 |
| 1310 | 1310 | 1310 | 1310 |
| 2100 | 2100 | 2100 | 2100 |
| 1911 | 1910 | 1910 | 1910 |
|  |  |  | 1981 |

MULTI-ACTIVITY:

| 1 | 2 | 3 | 4 |
|---|---|---|---|
| <u>1712</u> | <u>1712</u> | <u>1712</u> | <u>1712</u> |
| 1809 | 1809 | 1809 | 1809 |
| 1813 | 1813 | 1813 | 1813 |
|  | 1919 | 1919 | 1919 |
|  |  | 1924 | 1921 |
| 1009 | 1009 | PAUSE | 1009 |
|  |  |  | 2314 |
| 2102 | 2102 | 2102 | 2102 |
| 2105 | 2105 | 2105 | 2105 |
| 2005 | 2005 | 2005 | 2005 |
| 2300 | 2300 | 2300 | 2300 |
|  |  | 2109 | 2109 |
|  |  |  | 4002 |
|  | 2714 | 2714 | 2714 |

FIG. 5

2. VARIANT

1. TIME INTERVAL
$N_A = 2.467$
$N_B = 3.111$
$N_C = 2.467$ $N_{MA} = 8.045$ 0.054 +

2. TIME INTERVAL
$N_A = 3.951$
$N_B = 3.161$
$N_C = 3.301$ $N_{MA} = 10.413$ 0.031 +

3. TIME INTERVAL
$N_A = 4.687$
$N_B = 3.906$
$N_C = 3.906$ $N_{MA} = 12.499$ 0.040 +

4. TIME INTERVAL
$N_A = 5.519$
$N_B = 6.026$
$N_C = 7.471$ $N_{MA} = 19.016$ 0.116 = 0.241

2. ASSIGNMENT $N_A = 2.550$
$N_B = 3.200$
$N_C = 2.400$ $N_{MA} = 8.150$ 0.0003 +

STAFF SCHEDULING

CROSS-REFERENCE TO RELATED APPLICATIONS

This application claims foreign priority benefits under Title 35 USC §119 to European Patent Application No. EP 05 011 856.1, filed Jun. 1, 2005, the contents of which are incorporated herein in their entirety.

FIELD OF THE INVENTION

The present invention pertains in general to staff deployment scheduling, and for instance to methods and computer program products for the creation of deployment plans for staff members and for the configuration of telephone call routers by means of such deployment plans, as well as to a telephone call router which is accordingly configured.

BACKGROUND OF THE INVENTION

In numerous service and production branches there is the need to assign staff members in the framework of a deployment plan over a certain period of time to different jobs to be accomplished. To this end, traditionally deployment plans are created manually by means of experience values. For applications with a relatively high fraction of personnel costs and a temporary varying need of staff members, staff scheduling may be complicated; its optimization, however, may often lead to a considerable increase in productivity.

A typical context for the application of a staff scheduling system is a call center, at which a variable number of telephone calls arrives during the day which are answered by staff members divided into shifts. In many cases, call centers are a central connector in the relationship between a producer or service provider and a client. In some fields, such as direct banks and telecommunication service providers, call centers are, in fact, the only interface between the client and the company. Hence, many companies are interested in a client-orientated, and at the same time, efficient operation of their call centers, so that the management of call centers has become an application-orientated field of research in the realm of optimization. Thereby, the problem is essentially to conciliate the divergent aims to provide the client on the one hand with a quality of service that is as high as possible, and on the other hand to operate a call center in a cost-saving way.

A fundamental service quality parameter in the realm of call centers is for instance the accessibility, i.e. how quickly a client is connected to a staff member. In practice, it is frequently dealt with the quantity "telephone service factor" (TSF), which is composed of two components: a temporal target within which calls are to be answered by a staff member (for instance within 20 seconds) and a percentage of all calls, for which this target is achieved (for example 80 percent). In some call centers the average waiting time of the callers is used as a quantity to be measured in computing the accessibility. Telephone service factor and average waiting time, however, can be transformed into each other mathematically. A further parameter is, for example, the immediate solution rate, which expresses the percentage of all calls that are resolved in a first contact with the customer. A third parameter is the solution time, which indicates how long it takes until the customer is provided with a result.

The forecast of the number of telephone calls to be expected in a call center within a time interval—often denoted as working volume (number of telephone calls*average duration of a call/3600 seconds)—may be made by means of experience values, which are based on historical observations since the number of calls to be expected is subject to daily, weekly and seasonal cycles. The calculation of how many staff members are needed, in view of the predicted working volume, to achieve a certain quality of service can be performed using a formula which is common in the realm of call centers, the so-called Erlang C-formula (see Borst, S., and Seri, P., "Robust Algorithms for Sharing Agents with Multiple Skills," Bell Labs, Lucent Technologies, Murray Hill, N.J., 2000, p. 5). However, this formula makes some assumptions which do not always apply in reality and often leads in practice to personnel overstaffing of the call center so that there have been further attempts to make a more accurate forecast with regard to the number of call center staff members needed by means of simulation programs. In particular the Erlang C-formula assumes that each staff member is only qualified for one type of query.

Since typically in a call center customers call with different requests the staff members in their entirety have to possess different qualifications in order to be able to cover the spectrum of customer queries as far as possible. While in some call centers the staff members are only qualified for one type of request, in other call centers the staff members are trained in such a way that they may respond to different types of requests. As will be explained more precisely later, it is useful if at least some of the staff members are able to answer different types of queries. In this context, the so-called "pooling effect," which will be explained in more detail below, shows its impact. According to this effect a multiple qualification of staff members may lead to a better quality of service (cf. e.g. H. Henn et al., Handbuch Call Center Management, telepublic Verlag, Hannover, $2^{nd}$ edition, p. 204-205 and Borst and Seri, p. 9, who express this effect as follows: "Potential economies of scale from dynamically sharing the agents among the various call classes").

In the patent specification U.S. Pat. No. 6,044,355 of the company IEX Corp. a method for a temporary staff member scheduling in a working environment is presented, where individual staff members possess different qualifications and the requirement for staff members with different qualifications is subject to temporal fluctuations. The period of time to be simulated is divided into shorter time intervals and to every time interval a number of staff members—initially only estimated—with corresponding qualifications is assigned, and this number is adapted in the course of several passes of simulations by means of a feedback mechanism. Telephone calls are simulated according to the forecast call volume and how well the scheduled staff members, with their respective qualifications, handle the call volume is verified. The results of the simulation are evaluated statistically and are used to improve the assignment of staff members. After a series of simulation passes an assignment of staff members with the corresponding qualifications is found which achieves the desired quality of service.

SUMMARY OF THE INVENTION

According to a first aspect, a method is provided of creating a deployment plan for staff members with single or multiple qualifications for performing activities. Each activity requires at least a single qualification. The method includes the following operations performed by a computer: a deployment plan assignment of the staff members is repeatedly generated, and a quality of the assignment generated is assessed using a target function. One of the assignments is used on the basis of the assessment of the quality as the assignment representing the deployment plan. The target function includes a term that determines the quality of the assignments, such that the smaller the difference is between the number of the staff members deployed to the activities and the calculated total staff member requirement of the activities the higher the quality of the assignment.

According to another aspect, a method is provided of configuring a telephone call router on the basis of a deployment plan prepared for staff members with single or multiple qualifications for performing activities. Each activity requires at least a single qualification. The method includes: A deployment plan assignment of the staff members is repeatedly generated, and a quality of the assignment generated is assessed using a target function. One of the assignments is used on the basis of the assessment of the quality as the assignment representing the deployment plan. The target function includes a term that determines the quality of the assignments, such that the smaller the difference is between the number of the staff members deployed to the activities and the calculated total staff member requirement of the activities the higher the quality of the assignment. The telephone call router is configured so that it forwards telephone calls to one or more staff members, who are in service according to the deployment plan at the point of time of the telephone call, wherein the one or more staff members have the qualifications to answer the telephone calls.

According to still another aspect, a computer program product is provided for creating a deployment plan for staff members with single or multiple qualifications for performing activities. The computer program product resides on a machine-readable medium for storing computer instructions, or the computer program product is a signal propagated on a carrier encoding the computer instructions. The computer instructions, when executed on a processor-based machine, cause the processor-based machine to repeatedly generate a deployment plan assignment of the staff members, and assess a quality of the assignment generated using a target function. One of the assignments is used on the basis of the assessment of the quality as the assignment representing the deployment plan. The target function includes a term that determines the quality of the assignments, such that the smaller the difference is between the number of the staff members deployed to the activities and the calculated total staff member requirement of the activities the higher the quality of the assignment.

By "computer" is meant any device or system capable of executing and/or implementing the methods and systems described herein, including, but not limited to, the methods of creating a deployment plan for staff members with single or multiple qualifications for performing activities.

Unless otherwise defined, all technical and scientific terms used herein have the same meaning as commonly understood as one of ordinary skill in the art to which this invention belongs. Although methods, materials, apparatus, etc., similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features are inherent in the methods and products disclose or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 2 is a table that shows an example of available staff members and their corresponding qualifications.

FIG. 3 is a table that shows a first assignment and the resulting assessment by a target function in the context of a first variant of an optimization method.

FIG. 4 is a table that shows a second assignment (after execution of a move departing from a first assignment) and the resulting assessment by a target function of a first variant of the optimization method.

FIG. 5 is a table that shows an exemplary deployment plan where staff members are deployed to individual time intervals.

FIG. 6 is a table that shows assessments of the first and second assignment (from FIGS. 3 and 4) in the context of a second variant of the optimization method, in which the actual staff requirement is calculated by means of an approximation formula.

The drawings and the description of the drawings are of embodiments of the invention and not of the invention itself.

DETAILED DESCRIPTION

Figure 1:
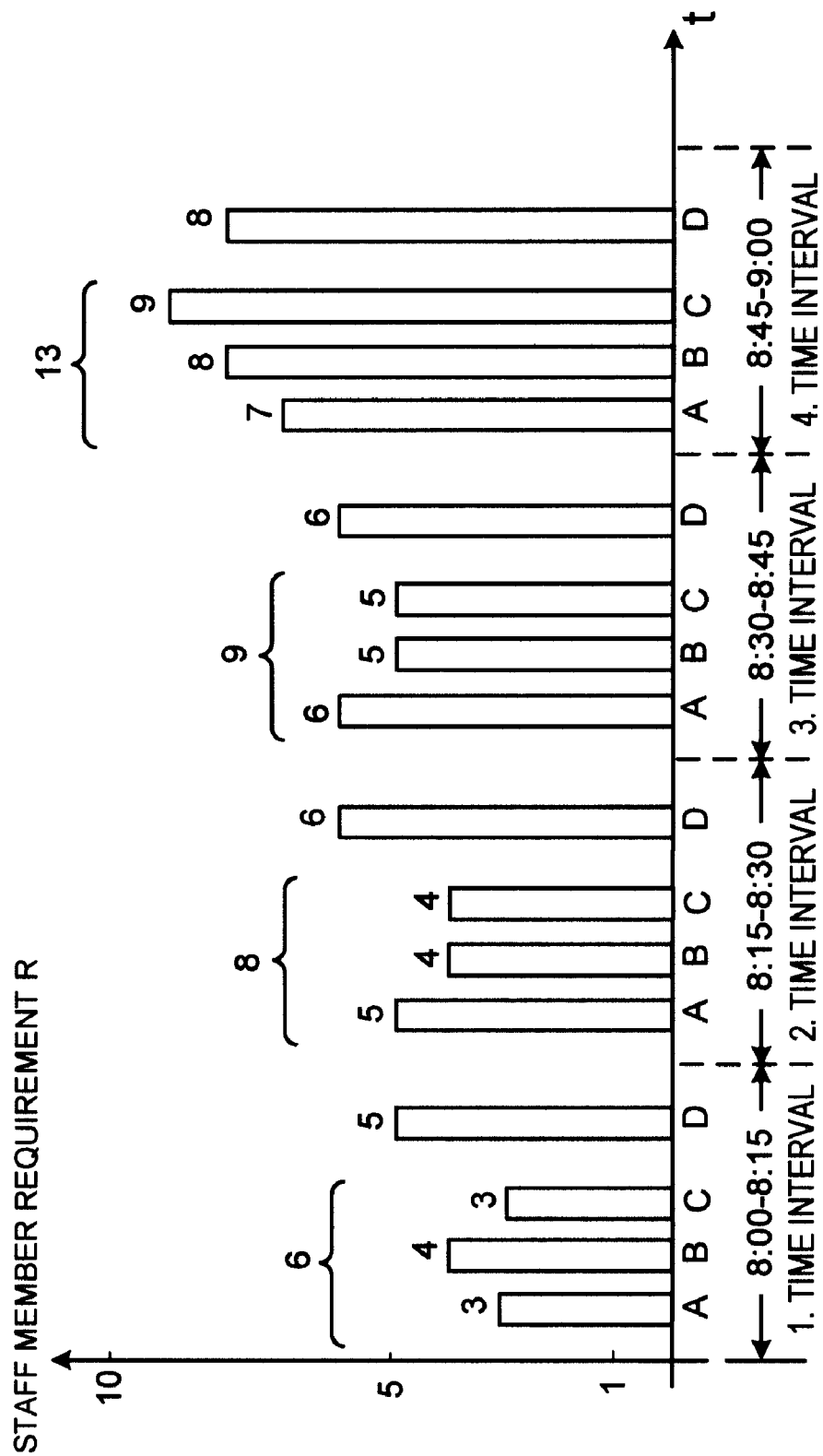
FIG. 1 is a chart that shows an exemplary requirement plan for a period of time for which a deployment plan is to be created.

FIG. 1 shows an exemplary requirement plan indicating how many staff members with which qualification are required over a time period of one hour in a call center. Before proceeding further with the description of FIG. 1, however, some items of the embodiments are discussed.

Firstly, it is noted that the present description and the claims relate not only to applications in the call center field, but also relate generally to deployment scheduling for staff members in other fields. The reference to call centers is therefore only exemplary.

The creation of deployment plans for staff members is a complex task, in particular, when the requirement of staff members is not constant over a time period. In the case of call centers, it is to be observed that incoming calls are not equally distributed over a day, but that in the morning and early evening hours peak requirements are observed, whereas during night the requirement decreases to a minimum. An additional difficulty, when assigning staff members to jobs, arises when different activities are to be accomplished and the staff members cannot only accomplish one job, but are qualified for several activities. In many cases, however, it is desirable that staff members may accomplish several activities. In a call center of a telecommunication company there are, for instance, customer calls which pertain to questions concerning telephone bills, telephone calls with a message concerning a malfunction, telephone calls comprising problems with an Internet access and telephone calls having to do with a purchase order. Whenever a customer with a request calls a call center, s/he normally dials a telephone number whose last digit(s) indicate(s) which request s/he has. Then s/he is put through by a telephone call router to a staff member who is available and qualified to deal with the matter. Alternatively, the customer dials a central number and then selects his/her request by means of a voice entry or digit entry in a menu. Normally, not all different requests of a customer, or types of telephone calls, may be answered by all staff members of a call center, but the staff members work in a specialized way on one type of call. In the case of a call center, an activity is referred to as the handling of one call type. Generally speaking, an activity is an action to which staff members are assigned. Thereby an activity may be executed by a staff member only if s/he is qualified for it. If a staff member is only qualified to perform one activity, this is referred to as single qualification. If a staff member is qualified for several activities, s/he possesses a multiple qualification.

If there are not sufficient staff members available to process a call type, a caller may not be put through to a staff member immediately under certain circumstances since all staff members are busy with the processing of other calls. The caller is then typically put into a waiting queue until all callers in front of him/her have been served and a staff member has become available and can address himself/herself to the customer. Contingent upon the importance of his/her telephone call and his/her patience, the customer will only wait a certain tolerance time in the waiting queue and will then abandon the call. Hence, companies are interested in keeping the waiting time over the whole day below this threshold. Since the call volume varies, a varying number of staff members is assigned to the individual call types at different times.

If each of the staff members only possesses a single qualification, one can imagine that a waiting queue exists for each call type which is served by a number of staff members with a single qualification. The number of staff members applied to a call type depends on a desired quality of service and an expected call volume.

Starting from the assumption—as a simplified example—that at the beginning of every minute a call arrives whose processing takes 45 seconds, no waiting queue arises since the call is already finished before a new call arrives. This assumption is however unrealistic, because the number of phone calls arriving per time interval at the individual waiting queues underlies a Poisson distribution with arrival rate $\lambda$.

For a Poisson distribution the following equations hold:

$$P(r) = \frac{\lambda^r e^{-\lambda}}{r!} \quad (1)$$

$$E = \lambda$$

$$\text{Var} = \lambda$$

$$\text{Sdev} = \sqrt{\lambda}$$

$$\text{Varc} = \frac{1}{\sqrt{\lambda}}$$

whereas $\lambda$ indicates the number of arriving calls per time interval. E denotes the expectancy value of the distribution, thus the mean number of arriving calls. Var is the variance, Sdev is the standard deviation and Varc the coefficient of variation (or relative standard deviation), thus the relation between standard deviation and expectancy value. The coefficient of variation is a measure of how irregular telephone calls arrive. Granted that there is a mean arrival rate of two telephone calls per minute and a mean processing time of two calls per minute, no waiting queue should be necessary if every 30 seconds a telephone call arrives and its processing also takes 30 seconds. Since the telephone calls, however, arrive stochastically distributed—and therefore irregularly—it may occur, in spite of the mean values which are tuned to each other, that a call arrives although the processing of the previous call has not yet been concluded. Then a waiting queue comes into existence and the coefficient of variation is a measure which indicates the likelihood of this occurrence. If the telephone calls are subject to a Poisson distribution, the coefficient of variation is the reciprocal value of the square root of the mean arrival rate.

If there are several staff members with a single qualification who specialize on one call type, there are several waiting queues, whereby each of the calls arrives according to a Poisson distribution. By training the staff members in such a way that all staff members may handle all call types (cross-training), one waiting queue may be created into which all calls are directed and they are processed sequentially by the staff members. A Poisson distribution comes into being whose mean (total) arrival rate $\lambda_g$ equals the sum of the arrival rate of the individual waiting queues $\lambda_i$.

$$\lambda_g = \sum_i \lambda_i \quad (2)$$

For the coefficient of variation of this distribution, it holds:

$$\text{Varc}_g = \frac{1}{\sqrt{\sum_i \lambda_i}} \quad (3)$$

By merging n Poisson processes with the same mean arrival rate $\lambda$ to one Poisson process, the coefficient of variation does not remain $$\frac{1}{\sqrt{\lambda}}$$

but decreases to the value $$\frac{1}{\sqrt{n}} \cdot \frac{1}{\sqrt{\lambda}},$$

thus by the factor $$\frac{1}{\sqrt{n}}.$$

This factor reveals that by merging, for example, four servers or waiting queues, the coefficient of variation decreases by 50%, but when merging eight waiting queues the coefficient of variation is reduced to 35%. The merging of only few waiting queues leads to a strong reduction of the coefficient of variation and thus of the waiting time and thus entails an amelioration of the service level. A cross-training of some staff members, so that these may work on all call types, leads to an advantage similar to that when all people are trained for all activities. If one does not want to improve the service level one can reduce the number of staff members instead.

This effect is described as a pooling effect in statistics and occurs if the variability of individual probability distributions may be reduced by merging. Illustratively, the pooling effect can be imagined as follows: if there are two waiting queues which are served by one staff member each who is qualified for one job only, then it can occur that there is no work for the one staff member while the other staff member has a waiting queue. If both staff members can take over the job of the other, then they can support each other in the handling of their jobs, if one of the staff members has nothing to do and a waiting queue builds up in front of the other staff member. By merging waiting queues, the utilization of staff members increases so that one can either improve the quality of service with a constant number of staff members or one can keep the quality of service and reduce the number of staff members. Of course, the pooling effect only leads to a reduction of costs if the staff members are not fully loaded.

Since the requirement of staff members per call type is not constant over a longer period of time, calculations in some embodiments are for small time periods of typically 15 minutes. In each of these time intervals the working volume is considered to be constant. The requirement of staff members corresponds to the working volume which is calculated according to the following formula.

$$\text{Work\_volume} = \frac{\#telephonecalls \cdot \text{process\_time}}{3600 \text{ sec.}} \quad (4)$$

The unit of the working volume calculated with this formula is called "Erlang" (after the Danish mathematician of this name). Historical data are used for the prediction of the working volume, since the working volume is subject to certain repeating daily, weekly and seasonal cycles. When planning the personnel requirement, the personnel requirement is derived from the working volume and a desired service level. The quality of service parameter "telephone service factor" that indicates that the percentage of calls of type j, at which the waiting time is longer than a certain period of time $\sigma_j$ is smaller than a certain fraction $\epsilon_j$ can be formulated as follows:

$$P[W_j > \sigma_j] \leq \epsilon_j \quad (5)$$

It is the aim of a further quality of service parameter that the calls of a call type j do not have to wait longer than a period of time $\tau_j$:

$$EW_j \leq \tau_j \quad (6)$$

By means of the following formulae a requirement of staff members R can be calculated for a given working volume 'a' and a service level:

$$P[W_j > t] = \pi(R_j, a_j) e^{-\frac{R_j - a_j}{b_j} t} \quad (7)$$

For the mean working time it holds:

$$EW_j = \pi(R_j, a_j) \frac{b_j}{R_j - a_j} \quad (8)$$

For the probability of a delay it holds:

$$\pi(R, a) = \frac{\frac{a^R}{R!} \frac{R}{R-a}}{\sum_{k=0}^{R-1} \frac{a^k}{k!} + \frac{a^R}{R!} \frac{R}{R-a}} \quad (9)$$

whereby $R_j$ denotes the number of staff members available for call type j, $a_j$ is the working volume of call type j and b denotes the mean service time. Since equation 9 cannot be solved analytically for R, in some embodiments the calculation is performed by inserting different numbers of staff members $R_j$ into the formulae mentioned above, until a number of staff members has been found which may handle the quality of service and the working volume. An efficient method for calculating the $R_j$ values which is used in some embodiments is disclosed for example in the US patent description U.S. Pat. No. 5,289,368. It is noted that the numbers of staff members required calculated in this way relate to the case that the staff members only possess a single qualification.

If one has calculated the staff member requirements for the individual call types, the following formula by Borst and Seri (p. 9) allows for calculating the total staff member requirement for the case that all staff members are qualified for all call types.

$$R = \sum_{j=1}^{N} a_j + \sqrt{\sum_{j=1}^{N} (R_j - a_j)^2} \leq \sum_{j=1}^{N} a_j + \sum_{j=1}^{N} (R_j - a_j) \quad (10)$$
$$= \sum_{j=1}^{N} R_j$$

As can be seen from the formula, the total requirement of staff members, when each staff member can process all call types (term left of "$\leq$") is smaller than the sum of staff member requirements for each individual call type at constant working volume and quality of service under the assumption that each staff member only possesses one single qualification (term right of "$\leq$").

As mentioned above, both situations define staff member requirements that do not correspond to a realistic situation since one frequently has a mixture of staff members with single qualifications, multiple qualifications and potentially complete qualifications (staff members can handle all call types) at one's disposal. This mixture of staff members with different qualifications, often denoted as a hybrid situation, is borne in mind in the method of the embodiments for creating a deployment plan for staff members.

When creating the deployment plan, staff members with single or multiple qualifications, are assigned to activities according to the calculated requirements. In some of the embodiments, this assignment is assessed by means of a target function. The target function comprises a term that determines the quality of the assignments, such that the smaller the difference is between the number of the staff members deployed to the activities and the calculated total staff member requirement of the activities the higher the quality of the assignment. As will be elucidated in more detail below, in a first variant a total staff member requirement is the value calculated with formula 10 which relates to the (in general unrealistic) case that all staff members possess complete qualifications. In the first variant it is possible to deviate from this unrealistic case by correcting the calculated total staff member requirement in view of the qualifications of the staff members effectively available as will be explained in more detail below. In the first variant the total staff member requirement is calculated only once whereas in the second variant a total staff member requirement is calculated with regard to the currently given staff member assignment which refers to the "hybrid situation." Thereby, the staff members are assigned to different shorter time intervals within which the staff member requirement is assumed to be constant. An optimization procedure checks different moves (i.e. changes of the given assignment) on a given assignment, by assessing the assignments newly arisen by means of the target function. Normally, a move leading to a assignment which is qualitatively more valuable is finally quasi executed. The precise proceeding is described below. The assignment which results from this move is a new starting point of the optimization procedure. New assignments are generated again and again until a sufficiently good assignment of staff members has been found. This assignment is then used as the deployment plan.

The assignment of staff members to activities occurs in some of the embodiments within an optimization procedure. One can imagine that the target function maps from a high dimensional space of assignments (assignment space) whereby each point represents a assignment of staff members with a number of qualifications to a scalar value representing the quality of the assignment. It is pointed out that the target function of the method is independent of the optimization procedure so that a series of different optimization procedures with one and the same target function may be applied. For exploring the assignment space, in particular for finding extremes in some of the embodiments, local search procedures are used. In the following, without restricting the generality, we assume that a minimum of the target function is searched for; although the searching for a maximum is possible in analogy to the following procedures.

Local search procedures, departing from the point in which they currently are, consider the assessments of neighbor points in order to decide in which direction to move. To this end, a neighborhood relationship is defined on the assignment space by defining that two assignments are considered as neighbored if they differ in each time interval at most by a certain number of staff members. The transition from one point into a neighbor point is denoted as an elementary step, whereby the assessment of the target function for the neighbor points of the point in which one is located at the moment (i.e. the testing of neighbored assignments) is denoted as test step. Departing from a point in the assignment space not all of the neighbored points need to be considered since some of them relate to assignments in which staff members are deployed longer than the admissible period of time agreed upon in the work contract. The assignment space is typically only explored in the area in which it has valid assignments in the sense of given framework conditions. A problem of local search procedures is that they can get stuck in a local minimum from which they cannot escape. There are, however, heuristics which try to prevent procedures from getting stuck in a local minimum, even if these do not guarantee that a global minimum will be found.

In some of the embodiments a hill climbing search strategy (cf. e.g., Russell, S., Norvig, P. "Artificial Intelligence—A Modern Approach", p. 111-112, Prentice Hall, 1995) is used for finding an optimum assignment. In order to find a minimum, the search goes over, departing from a random starting value, in each elementary step into the neighbor point with the lowest assessment. This transition into points with minimal assessment occurs until the minimal assessment of all neighbor points is higher than the assessment of the current point, i.e. all neighbor points have a higher assessment than the current point, which in turn means that the current point represents a local minimum. If this is the case, the current point is returned as the result of the search. In order not to get into a relatively high minimum, the hill climbing search strategy is repeated by starting from a series of randomly selected starting points and choosing the lowest of all found minima (random restart hill climbing).

In other embodiments, a so-called simulated annealing procedure (Russell, et al., p. 113-114) is used for finding a minimum as good as possible of the target function. The idea of simulated annealing goes back to computer simulation of annealing procedures of certain materials (spin glasses), which are liquid at high temperature (high molecular flexibility) and which get a regular grid structure with minimal energy by careful annealing. In the context of the method, a temperature schedule is initially defined which indicates for each optimization step a temperature value. The temperature schedule describes an annealing procedure with falling temperatures. In the context of the analogy of the annealing procedure, high temperatures mean big increments and lower temperatures refer to smaller increments. At first, the procedure performs a spatial search which is gradually refined. Initially, a larger assignment which is to be optimized is assessed. On this initial assignment, a move is performed by changing and assessing the initial assignment. To this end, one of the neighbor points of the assignment is randomly selected and this value is compared to an assessment value of the current assignment. If the randomly selected neighbor point yields a lower value, it is passed over to this point in the assignment space. However, if the neighbor point yields a lower assessment, it is passed over to this point only with a certain probability. The transition probability depends on the temperature defined for the current optimization step in the temperature schedule and on the size of the deterioration considered acceptable when passing over to the new state. Since the temperature is initially still higher and is lowered in the course of the procedure, the transitions into a lower state are more probable at the beginning than at a later point of time. With the temperature to be lowered, the simulated annealing procedure remains preferably in the current state if a randomly selected assignment yields a worse assessment result and does not go into a deterioration. The simulated annealing procedure prevents one from getting stuck in a local minimum relatively quickly. The optimization procedure finishes after a predetermined number of optimization steps has been executed.

In other embodiments, genetic algorithms (Russell, et al., p. 619-621) are used for the creation of a deployment plan for staff members. Genetic algorithms are procedures which find a solution to a problem which cannot be solved analytically. In the case of deployment plans to be optimized staff member assignments are mutated and combined with each other until an assignment corresponds to the set requirements, i.e. possess a certain quality. The basic idea of genetic algorithms is, in allusion to biological evolution processes, to randomly generate a number of solution candidates (individuals, here: assignments) and to select those which correspond best to a certain assignment quality. The assignments are then slightly mutated and combined with each other to generate new assignments (a new generation). The typical genetic algorithm comprises the following steps:

1. Initialization: Generating a sufficiently large number of different assignments.
2. Evaluation: For each individual assignment an evaluation is determined by means of a target function (in this context also called fitness function).
3. Selection: Random selection of assignments from the given number of assignments. For this reason, assignments with better target function values are selected with a higher probability.
4. Recombination: Different assignments are combined and a new generation of assignments is generated from the new assignments (reproduction).
5. Mutation: Changes are randomly executed on the assignments of the new generation.
6. According to a certain procedure, the number of new assignments is created from the number of old assignments and the number of mutated successors of the winners of the number of the old assignments. Subsequently, the algorithm is repeated beginning from step 2 or is finished after a stop criterion and the assignment with the highest quality is defined as a deployment plan.

In still other embodiments, the so-called taboo search is used for finding a minimum of the target function. To this end, the target function is explored departing from a starting value. Departing from a starting value and all neighbor points are assessed in the search space by means of a target function. The starting value (the initial assignment) is initially assigned to a variable "solution" and a variable "best_solution." Furthermore, a taboo list is kept into which all points are listed which have been visited and which must not be visited anymore. The starting value is recorded in this list initially. The neighbor of the starting value which gets the lowest assessment by the target function is considered as the new solution, the method passes over into this point and the point is recorded in the taboo list. If the assessment of a neighbor is smaller than "best_solution," the neighbor assignment is also assigned to the variable "best_solution." Departing from this neighbor point, its neighbor points, in turn, are considered and one passes over into the point with the lowest assessment and which is not listed in the taboo list. It is pointed out that in fact one passes over to the neighbor point with the lowest assessment, but this point does not have to have an assessment less than that point in which one is located momentarily. In this way, one can escape a local minimum since one is not allowed to pass over into a point which has been visited (and is therefore in the taboo list). Hence, if there is the point among the neighbors with the lowest assessment in the taboo list one passes over to the neighbor point with the lowest assessment which is not in the taboo list. In the variable "best_solution" one keeps in mind all the points visited, that one which has received the lowest assessment. This assignment is returned as deployment plan.

In other embodiments a branch-and-bound procedure for creating an optimized deployment plan is used. The branch-and-bound procedure comprises essentially two operations. In the branching step of the procedure, the assignment problem is divided into disjoint sub-problems. In the bounding step, those sub-problems are eliminated which do not promise any improvement in comparison to the currently best solution. Beginning with the original problem, both steps are repeated until all problems are eliminated and an optimal solution is found. The procedure can be best imagined by example of a tree. A solution tree is progressively generated and a bound is calculated at each node. Then, those branches are eliminated that do not lead to any success.

In the following, the two above-mentioned variants of the procedure, which has been described in general above, of creating deployment plans for staff members with single or multiple qualifications are elucidated. The two variants differ in that in the first variant the total staff member requirement is calculated only once before the iteration of the optimization procedure, hence it is, so to speak, globally approximated, whereas in the second variant the total staff member requirement is calculated in the sense of an actual requirement of the assignment to be tested in every optimization step.

We differentiate in the following between two different kinds of activities, namely so-called "multi-activities" and so-called "normal activities." A multi-activity is a thought bundling of activities, in this context also called sub-activities, to which staff members with single or multiple qualifications are assigned. Hence, it is not the case that only staff members who have all the qualifications of the multi-activities are assigned to those. Rather, staff members who are qualified for a sub-set of the activities only (hence several or only one of the activities of the multi-activities) may be assigned to a multi-activity. It is pointed out that the concept of the multi-activity does not imply that the sub-activities belonging to multiple activities are executed at the same time. Normally, the activities of a multiple activity are related in an organizational or semantic connection.

In the context of both variants, some of the sub-activities are merged into a multi-activity. In the first variant, a total staff member requirement is calculated on the assumption that all staff members assigned to this multi-activity are qualified for all activities of this multi-activity. This total staff member requirement, however, is based upon an assumption which is normally not met in reality so that this calculation of the total staff member requirement leads to an underestimation of the total staff member requirement. Therefore, in some of the embodiments an adaptation of the total staff member requirement calculated by means of equation (10) is performed by involving the qualifications of all staff members available for an assignment to a multi-activity into the calculation of the total staff member requirement. This adaptation of the total staff member requirement can occur by means of an approximation formula (39) of the second variant which will be explained below. It is pointed out that such an adaptation of the total staff member requirement in the first variant is executed, in contrast to the second variant, only once before the beginning of the search procedure. Furthermore, for each individual activity of the multi-activity, a staff member requirement (activity staff member requirement) is calculated on the assumption that each staff member is qualified for only one activity. The total staff member requirement of the multi-activity is thereby smaller than the sum of the staff member requirements of the activities of the multi-activity. Besides the term calculated by means of formula 10 which assesses assignments to be more qualitatively high, the smaller the difference is between the number of staff members which are applied to the activities and the calculated total staff member requirement, the target function possesses in a first variant a further term which assesses assignments to be more qualitatively high, the smaller the difference is between the activity staff member requirement for each individual activity and the number of staff members assigned to the multi-activity who are qualified for the activity. This further term prevents that only assignments with a minimal total staff member requirement are considered as qualitatively high, but also that the coverage of the sub-activities is involved in the optimization.

In the second variant, though, a requirement value is calculated for the staff members, who have been assigned in each optimization step, and therewith defined qualifications, which considers which percentage of staff members that have been assigned to a multi-activity in one optimization step is qualified for an activity. This requirement value is orientated towards the effective qualifications which have been defined by means of a concrete staff member assignment and can therefore be understood as an approximation of the actual staff member requirement for an assignment which has been generated within one optimization step. The calculation of this approximation value, which is performed in each optimization step, is based in some of the embodiments on requirement values—to be calculated once in advance in the first variant—for the boundary situations that all staff members are qualified for all activities and that all staff members are qualified for one activity only. The approximation value is compared in the target function in each optimization step with the total number of staff members who have been assigned to the multi-activity. The smaller this difference is, the more qualitatively high the assignment is assessed to be.

In the second variant, in some of the embodiments, the checking of the extent to which the staff member requirements of the sub-activities are covered by the assignment is not applied since this information is indirectly incorporated by means of the approximation of the effective staff member requirement into the optimization. Nevertheless, it can be useful to incorporate the coverage of the staff member requirement of the sub-activities into the assessment function. This term allocates penalty points if individual staff member requirements of sub-activities are not sufficiently covered by the selected assignment.

In some of the embodiments, besides the multi-activities there are also normal activities. These consist exactly of one activity. They are not interrelated to other activities and are to be considered as separate from them.

In some of the embodiments, the set of multi-activities and the set of normal activities represent two disjoint sets whereas a staff member with a multiple qualification may be qualified for both an activity within a multi-activity and for one or several normal activities. Indeed, in some of the embodiments a staff member can only be applied to either a normal activity or to a multi-activity. In some of the embodiments—in both the first and the second variant—a term is provided in the target function with regard to the normal activities which involves the coverage of staff member requirements of the normal activities into the optimization. This term yields an assessment which assesses an assignment the more qualitatively high, the smaller the difference is between the activity staff member requirement calculated for each normal activity and the number of staff members applied to each normal activity.

The staff member requirements are not constant over the time period during which a deployment plan is to be created. Therefore, this longer period of time is divided into shorter time intervals within which a constant staff member requirement for the respective activities is assumed. In some of the embodiments in the call center realm, this time interval is often in the magnitude of 15 minutes. It is pointed out that the assignment of staff members to time intervals has to comply with some boundary conditions since e.g., the working time of the staff members is limited to legal conditions and the work contracts of staff members (e.g., part time or full time). Furthermore, the staff members are interested in accomplishing the work in one piece without interruptions—apart from break—times. As mentioned above, in the assignment space, only assignments are considered which comply with the boundary conditions.

In some of the embodiments, provision is made for staff members to be manually assigned to activities. These staff members are assigned in a fixed way and cannot be removed from this activity by an optimization procedure, although it might be more advantageous to schedule them in another time interval. The manual assignment of staff members to activities enables group or shift leaders, for example, to be assigned in a fixed way so that for each time interval a group leader is present. The staff member assignments which are done manually are therefore optimization-independent.

Call centers typically possess one or several telephone call routers within an automatic call distribution (ACD) system that is in charge of executing the incoming telephone calls according to a given system which is also adapted to the requirements to the work places. An ACD system, besides having a telephone call router, also comprises further components, for example, a statistic unit in which statistical records over incoming telephone calls are made. The telephone call router is the core piece of the ACD system. It is either a constituent of the telephone system (integrated ACD system) or is connected by coupling (example given LAN) with the configuration (adapted system). Here, the decision concerning the forwarding of the telephone calls is carried out according to the requirements of the summary of all operation-relevant states (e.g., states of the agent telephone, number of telephone calls which have to be distributed at the moment). In order to be able to distribute the calls to the work places, a telephone call router is provided in some of the embodiments which has a deployment plan at its disposal which was created in the way described above. For this reason the telephone call router knows at this point of time how many staff members are available for an incoming telephone call who may be able to handle a call. The telephone call router forwards the telephone call by means of a deployment plan to one of these persons.

Some of the embodiments pertain to a computer program product with program code for performing the described methods. The computer program product includes any machine-readable medium that is capable of storing or encoding the program code. The term "machine-readable medium" shall accordingly be taken to include, for example, solid state memories and, removable and non removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g., transmitted over a copper cable or through the air, or a light wave transmitted through an optical fiber. The program code may be machine code or another code which can be converted into machine code, such as source code in a multi-purpose programming language, e.g., C, C++, Java, and/or C#. The embodiments of a computer system may be commercially available general-purpose computers programmed with the program code.

DETAILED DESCRIPTION OF EMBODIMENTS

In the following, embodiments for both variants are presented in detail. For this purpose, four objects are used: staff members E, qualifications Q, activities A and multi-activities MA. In the context of activities a distinction is made between activities that are assigned to a multi-activity ($A_{MA}$) and normal activities ($A_N$) which are not assigned to a multi-activity. In the realm of personnel scheduling, staff members E possess one or several qualifications Q. By the assignment of qualifications Q to activities A it arises that one or several activities are implicitly assigned to staff members.

Variables and Characteristic Figures

In order to be able to describe the scheduling method including the target function more precisely, at this point, some variables are introduced which result, in combination, in three important characteristic figures. The method which is described here is not bound to these characteristic figures; they serve solely as a simplified representation of the scheduling method.

Used Variables

Requirement Per Activity of a Multi-Activity:

$$R_{A_{MA}}(t) \quad (11)$$

This variable describes the staff member requirement of an activity A which is assigned to a multi-activity MA at the point of time t.

Number of Staff Members Per Activity of a Multi-Activity; Procedure-Independent $$E_{A_{MA}}(t) \quad (12)$$

This variable describes the number of all staff members E who are scheduled at the point of time t to an activity $A_{MA}$. This value does not depend on the current optimization step of the method since the optimization, for the case that a staff member is supposed to adopt an activity $A_{MA}$, assigns the staff member automatically internally to the corresponding multi-activity MA.

Number of Staff Members per Activity of a Multi-Activity; Procedure-Dependent $$E_{MA \times A_{MA}}(t) \quad (13)$$

This variable describes the number of all staff members E who are scheduled at the point of time t to the multi-activity MA and who are able to adopt the activity $A_{MA}$ according to their qualifications. This value is dependent on the current optimization step of the method.

Available Capacity:

$$C_{A_{MA}}(t) \quad (14)$$

This variable describes the extent of the totally available capacity for an activity of a multi-activity. This means that the working potential of all staff members who can take over the activity $A_{MA}$ at the point of time t. The activity $A_{MA}$ is thereby assigned to a multi-activity MA; this means that only the capacity of activities that are assigned to multi-activities is calculated. Concretely, this value is formed from the sum of all staff members who, at the point of time t, take over the activity $A_{MA}$ either by direct assignment of the user or take over the multi-activity MA by the optimization procedure at the current optimization step and could take over the activity $A_{MA}$ due to their qualification.

With the aid of (12) and (13) the following formula arises:

$$C_{A_{MA}}(t) = E_{A_{MA}}(t) + E_{MA \times A_{MA}}(t) \quad (15)$$

This also means that staff members who are assigned at the time interval t to a multi-activity MA go into the corresponding calculation of capacity for each activity $A_{MA}$ that they can take over.

Requirement Per Multi-Activity:

$$R_{MA}(t) \quad (16)$$

This variable describes the staff member requirement for a multi-activity MA at the point of time t. This value is formed according to equation (10) from the staff member requirements $R_{A_{MA}}$ of the sub-activities. As mentioned above, in the first variant, this variable does not only relate to a staff member requirement under the assumption that all staff members are qualified for all activities but also relates in some of the embodiments to adaptations of the staff member requirement to actually available staff member qualifications. In some embodiments of the first variant, this variable relates to the qualifications of all staff members that are available to be assigned to a multi-activity.

Number of Staff Members of a Multi-Activity:

$$E_{MA}(t) \quad (17)$$

This variable describes the number of all staff members E that are assigned to a multi-activity MA at the point of time t. This value is dependent on the current optimization step of the method since the optimization internally schedules staff members to a multi-activity MA who are supposed to take over at the point of time t at least one activity A Bodies on Chair:

$$BOC_{MA}(t) \quad (18)$$

This variable describes the current number of staff members E that have been scheduled at the point of time t and that have already been assigned a multi-activity MA or activity $A_{MA}$. Under consideration of the variables (17) and (12), it holds:

$$BOC_{MA}(t) = E_{MA}(t) + E_{A_{MA}}(t) \quad (19)$$

Requirement Per Normal Activity:

$$R_{A_N}(t) \quad (20)$$

This variable describes the staff member requirement for a normal activity $A_N$ at the point of time t which is not assigned to a multi-activity MA.

Staff:

$$S_{A_N}(t) \quad (21)$$

This variable describes the number of staff members E that have been scheduled at the point of time t by the optimization procedure to the activity $A_N$.

Calculated Characteristic Figures

Current Capacity Balance:

$$R_{A_{MA}}(t) - C_{A_{MA}}(t) \quad (22)$$

This characteristic figure describes the current balance at the point of time t of the staff member requirement R of a sub-activity $A_{MA}$ and the available amount of staff member capacity C for the same sub-activity. This difference also indicates the requirement still to be covered for a sub-activity $A_{MA}$ on the basis of the capacity of the staff members. The value is bound to a time interval and is dependent on the optimization step of the method.

Current Staff Member Balance for Normal Activities:

$$R_{A_N}(t) - S_{A_N}(t) \quad (23)$$

This characteristic figure describes the balance for activities, that are not assigned to a multi-activity ($A_N$), of a staff member requirement R and the staff members (staff S) who have been scheduled at the point of time t to these activities. This difference indicates the staff member requirement per activity $A_N$ still to be covered and is dependent on the optimization step.

Current Staff Member Balance for Multi-Activity:

$$R_{MA}(t) - BOC_{MA}(t) \quad (24)$$

This characteristic figure corresponds to the staff member requirement for a multi-activity MA at the point of time t still to be covered. Thereto, the difference between a staff member requirement for a multi-activity $R_{MA}$ and the number of staff members who take over the multi-activity MA or one of the subordinate activities $A_{MA}$ is formed. This value is indicated in dependence on the multi-activity at the point of time t and is influenced by the current optimization step.

Requirement and Capacity Calculations

Requirement Calculation

The requirement which is of importance for the embodiments of the scheduling method described here is that of the staff members related to the activities and of multi-activities, that the staff members may take over implicitly by their qualifications.

In the context of this method, the requirement for the multi-activities MA is of particular importance since it does not necessarily correspond to the sum of the requirements of the subordinate activities $A_{MA}$ due to the pooling effect.

In personnel deployment scheduling this means that the requirement for multi-activities is handled like the requirement for normal activities A. Thereby, it concerns in general a staff member requirement R for the indicated activity ($A_N$ or $A_{MA}$) or multi-activity (MA).

The requirement for multi-activities is thereby smaller or equal to the sum of all requirements of all subordinate activities since staff members that are capable of accomplishing several activities due to their qualifications may be able to execute them simultaneously depending on the activity type. Since exactly those activities are assigned to multi-activities, it holds:

$$R_{MA} \le \sum_{A_{MA}} R_{A_{MA}} \qquad (25)$$

In the space between $R_{MA}$ (whereby $R_{MA}$ indicates the staff member requirement under the assumption that all staff members are qualified for all activities or involves in a modified form the effectively available staff member qualifications) and $$\sum_{A_{MA}} R_{A_{MA}}$$

represents the range of optimization.

The work force of each individual staff member is thereby multiplied by the number of activities per multi-activity and is (increasingly) considered, for example, according to ErlangC in the personnel requirement calculation. If all staff members were able to perform all activities per multi-activity the lowest level personnel requirement $R_{MA}$ would be reached.

To expand the term to the total personnel requirement, the equation 25 should be extended by the sum of requirements of all those activities that cannot be merged into a multi-activity (cf. equation 20), that indeed can be taken over by at least one staff member. After expansion by $$\sum_{A_N} R_{A_N}$$

it holds for the total personnel requirement $$\sum_{A_N} R_{AN} + R_{MA} \le \sum_{A_N} R_{AN} + \sum_{A_{MA}} R_{A_{MA}}. \qquad (26)$$

Capacity Calculation

Capacity calculation is also of importance for the course of actions of this method. It is influenced by the work force of each staff member and hence by the activities that s/he may overtake. The calculation is performed on the basis of the activities.

The available capacity C for an activity of a multi-activity $A_{MA}$ is formed from the sum of all staff members that are scheduled to the activity $A_{MA}$ or that take over the multi-activity MA and could take over the subordinate activity $A_{MA}$ due to their qualifications. It is to be noted that the staff members are considered inclusively of a performance index in the capacity calculation.

The performance index is a percentage value that may be different depending on the qualifications per staff member per activity. It may adopt values between 0% and 100% and enters as factor (from 0.0 to 1.0 transformed) exclusively into the capacity calculation.

Optimization Method

Basically, two different target function terms are considered in the optimization procedure. These are formed from the characteristic figures described above.

The first target function term describes how usual activities $A_N$ are to be treated, the second, how multi-activities $A_{MA}$ are treated. Additionally for the treatment of the multi-activities a condition is added, if necessary.

In the following a target function for the first variant of the optimization method is elucidated. The target function considered here has three terms.

$1^{st}$ Term: Maximization of the Coverage for a Normal Activity $A_N$ $$\left( \frac{R_{A_N}(t) - S_{A_N}(t)}{R_{A_N}(t)} \right)^2 \to 0 \qquad (27)$$

The purpose of this target function term is to assure that the staff member requirement for normal activities $A_N$, hence such activities that are not assigned to a multi-activity, is covered as well as possible. Thereto, the requirement and the allocation depending on the optimization step for the same activity is used. If, for example, all staff members are assigned to a multi-activity, this term is not applied.

$2^{nd}$ Term: Maximization of the Coverage for a Multi-Activity:

$$\left( \frac{R_{MA}(t) - BOC_{MA}(t)}{R_{MA}(t)} \right)^2 \to 0 \qquad (28)$$

The purpose of this target function term is to assure that a multi-activity MA is covered as well as possible. In contrast to the target function term for normal activities, here instead of the normal staff (staff S), the allocation of those staff members is used that are assigned to the multi-activity MA or to a subordinate activity $A_{MA}$ (bodies on chair BOC). Also this value is dependent on the optimization step since the number of the staff members scheduled to the multi-activity depends thereon. Since by the optimization no individual activities of a multi-activity $A_{MA}$ are assigned, only staff members may have been assigned to such activities by previous entries (e.g., by a planner). This means that the value $E_{A_{MA}}(t)$ (see formula 19) is not dependent on the optimization step. The only component that depends on the optimization step is therefore the allocation for the multi-activity $E_{MA}(t)$.

It is pointed out that in some embodiments the value $R_{MA}$ enters the calculation with a correction factor which considers staff members' qualifications which are indeed available and the value $R_{MA}$ is therefore increased. This is based on the fact that value $R_{MA}$ without a correction factor yields an underestimation of the staff member requirement since it relates to the case that all staff members are qualified for all activities. This adaptation of the value $R_{MA}$, however, happens only once in contrast to the second variant in which a staff member requirement is calculated for each generated assignment by means of qualifications occurring in this assignment.

$3^{rd}$ Term: Coverage of the Activity Staff Member Requirements:

The Following Condition for Maximization of the Coverage of a Multi-Activity Holds:

$$C_{A_{MA}}(t) \geq R_{A_{MA}}(t) \tag{29}$$

At each optimization step, it should be ensured, when assigning a staff member to a multi-activity MA, that the condition above is fulfilled for each sub-activity $A_{MA}$.

This is accomplished by the following third target function term:

$$\left(\frac{R_{A_{MA}}(t) - C_{A_{MA}}(t)}{R_{A_{MA}}(t)}\right)^2 \to 0 \tag{30}$$

It is to be assured by this target function term that the requirement for each activity of a multi-activity $A_{MA}$ is covered as well as possible by the available capacity $C_{A_{MA}}$ dependent of the optimization step. The performance index is considered when calculating the capacity C for each activity for each staff member. As described, for this calculation all staff members are involved that are scheduled to the activity $A_{MA}$ in the run-up and also those staff members that are scheduled at the optimization step to the multi-activity MA and that could execute the activity $A_{MA}$ according to their qualifications.

When evaluating the third target function term additionally the following holds: only those sub-activities $A_{MA}$ are involved into the assessment for which the condition $C_{A_{MA}}(t) \geq R_{A_{MA}}(t)$ is not fulfilled, otherwise the corresponding sub-activity $A_{MA}$ is not considered and goes into the term with the value "0." In other words, the term assigns penalty points only for under-coverage, but not for over-coverage.

Of course, scenarios are conceivable for which the condition 29 cannot be fulfilled, e.g., then, if all staff members who could execute an activity of a multi-activity $A_{MA}$ are scheduled at the current optimization step to a normal activity $A_N$ for which they are also qualified. This state could be reached by treating the requirement for the normal activity $A_N$ in a prioritized manner so that the requirement for the activity $A_{MA}$ could not be covered.

Course of Actions:

The target function terms just described form two or three different values under consideration of the condition for maximization of the coverage for multi-activities MA. For the optimization procedure, a single target value is calculated herefrom for each optimization step, so that the result of the last move can be assessed qualitatively. The optimization procedure should be able to make an assertion regarding the state of the coverage of all activities. To this end, a value is formed, in a simplified manner, over all target functions and over all activities. This does not represent a problem when there is a total of the terms since every two or three target functions yield a squared percentage coverage value of the respective activity.

Under consideration of an optimization over all time intervals t, the following expression has to be minimized:

$$\sum_t \left( \sum_{A_N} \left(\frac{R_{A_N}(t) - S_{A_N}(t)}{R_{A_N}(t)}\right)^2 + \left(\frac{R_{MA}(t) - BOC_{MA}(t)}{R_{MA}(t)}\right)^2 + \sum_{A_{MA}} \left(\frac{R_{A_{MA}}(t) - C_{A_{MA}}(t)}{R_{A_{MA}}(t)}\right)^2 \right) \to 0 \tag{31}$$

As already mentioned, in the third term one has to bear in mind the following factors concerning the sub-activities $A_{MA}$: the field of the expression relating to the sub-activities is only then involved in the calculation for those multi-activities $A_{MA}$ for which the condition $C_{A_{MA}}(t) \geq R_{A_{MA}}(t)$ does not hold, otherwise the corresponding sub-activity $A_{MA}$ is not considered and goes into the third term with the value "0." It is pointed out that in some embodiments the target function (31) is applied without the third term. The third term is useful in particular then if the $R_{MA}$ value used constitutes an underestimation of the total staff member requirement (e.g., under the assumption that the $R_{MA}$-value indicates the number of staff members in the case that all staff members are qualified for all activities).

In the Following, the Second Variant of the Method is Elucidated in More Detail.

As explained above, the $1^{st}$ variant is based on the (in general not always appropriate) assumption that all staff members are qualified maximally; accordingly the total staff member requirement $R_{MA}$ is calculated for the multi-activity MA once and is used at each optimization step in the total target function. In this function the coverage is optimized on the one hand in the direction of the theoretical minimal requirement of the multi-activity $R_{MA}$ (which would be given if the assumption of the maximal staff member qualification were accurate) or in the direction of—as described above—an adapted value $R_{MA}$; and on the other hand the effectively available qualifications and capacities on the level of the individual sub-activities are considered.

In the $2^{nd}$ variant, however, in each optimization step the staff member requirement of the multi-activity $R_{MA}$ is adapted to the "hybrid situation," i.e. to that combination of qualifications which is existent at the staff member assignment in the respective optimization step, for example by recalculating this hybrid staff member requirement in each optimization step, or by taking an appropriate value from a table with pre-calculated values in each optimization step. The last target function term of the $1^{st}$ variant which considers qualifications and capacities on the level of the individual sub-activities can therefore be dispensed with in some embodiments of the $2^{nd}$ variant; in some embodiments, however, it is also used in the $2^{nd}$ variant.

Variables and Characteristic Figures

In order to be able to describe the target function more precisely, at this point some variables are defined which, in combination, yield three characteristic figures (these definitions and characteristic figures correspond partly to those of the $1^{st}$ variant, whereby partly other designations are used). The adaptations described here are not bound to these characteristic figures; these serve solely for the simplified representation of this method variant.

Used Variables

Number of Qualified Staff Members Per Activity of a Multi-Activity;

Procedure-Dependent:

$$E_{Q(A_{MA})} \qquad (32)$$

This variable describes the number of all staff members E who are qualified for performing the activity $A_{MA}$. This value is dependent of the current state of the optimization, i.e. that only those staff members are used for total formation that are scheduled in the optimization step and could take over the activity $A_{MA}$.

Number of Staff Members of a Multi-Activity (Procedure-Dependent):

$$E_{Q(MA;A_{MA})} \qquad (33)$$

This variable describes the sum of all staff members E who can take over at least one of the activities $A_{MA}$ of a multi-activity according to their qualifications. This value is also dependent on the current state of the optimization, i.e. that only those staff members are used for total formation who are scheduled in the optimization step and who could take over at least one of the activities $A_{MA}$ of a multi-activity.

Sum of the Requirements of all Activities of a Multi-Activity:

$$\sum_{A_{MA}} R_{A_{MA}} \qquad (34)$$

This variable describes the sum of all staff member requirements of all activities of a multi-activity $A_{MA}$.

Requirement of a Multi-Activity:

$$R_{MA} \qquad (35)$$

This variable describes the staff member requirement for a multi-activity MA in the case that all staff members are maximally qualified.

Ratio of Qualified Staff Members Per Activity of a Multi-Activity:

$$K_{A_{MA}} = \frac{E_{Q(A_{MA})}}{E_{Q(MA;A_{MA})}} \qquad (36)$$

This coefficient describes the set of staff members who are qualified for the activity $A_{MA}$ in relation to those who are qualified for the multi-activity MA. Since both values may alter during the optimization this coefficient also varies. The range of values of this coefficient lies between 0 and 1.

Ratio of Staff Member Requirement Per Activity of a Multi-Activity:

$$G_{A_{MA}} = \frac{R_{A_{MA}}}{\sum_{A_{MA}} R_{A_{MA}}} \qquad (37)$$

This factor describes the ratio between the staff member requirement of an activity of a multi-activity $A_{MA}$ and the sum of requirements of all such activities.

Ratio of Staff Member Requirement Per Activity of a Multi-Activity (in Relation to the Staff Member Requirement of a Multi-Activity):

$$F_{A_{MA}} = \left( \frac{R_{A_{MA}}}{\sum_{A_{MA}} R_{A_{MA}}} \right) \cdot R_{MA} \qquad (38)$$

This factor describes the ratio between the staff member requirement of an activity of a multi-activity $A_{MA}$ and the sum of requirements of all such activities. In the subsequent multiplication the ratio is converted to the staff member requirement for the multi-activity $R_{MA}$. Since the values $R_{MA}$ and $R_{MA}$ are calculated by means of equations 5-10 for each interval only once, the $F_{A_{MA}}$ values remain constant in each optimization step.

Approximation of a Requirement Per Activity of a Multi-Activity:

$$N_{A_{MA}} = (1 - K_{A_{MA}}) \cdot R_{A_{MA}} + K_{A_{MA}} \cdot F_{A_{MA}} \qquad (39)$$

This formula, which is used in some of the embodiments, approximates a new staff member requirement for the activity of a multi-activity $A_{MA}$. It is pointed out that the individual $N_{A_{MA}}$ values of the multi-activity MA calculated by means of equation 39 are to be understood as auxiliary values which represent only in sum (cf. equation 40) a meaningful value, namely the total staff member requirement of the multi-activity. The results of formula 39 are therefore only to be understood as intermediate results. The term represents a convex combination and yields for each activity $A_{MA}$ of a multi-activity MA a value between the two boundary values $R_{A_{MA}}$ and $F_{A_{MA}}$. This recalculation thereby considers the modified relationships of the staff members available for the activity $A_{MA}$. It is pointed out that this approximation for the value $K_{A_{MA}} = 1$ (all staff members of a multi-activity MA are qualified for activity $A_{MA}$) yields the value $F_{A_{MA}}$. If all $K_{A_{MA}}$ values equal one (all staff members are qualified for all activities) the sum of all $F_{A_{MA}}$ values yields the value $R_{MA}$. If it applies in the other extreme case $K_{A_{MA}} = 0$ (no staff member of the multi-activity MA is qualified for activity $A_{MA}$) the value $R_{A_{MA}}$ is yielded. If all $K_{A_{MA}}$ values equal zero, the sum of all $R_{A_{MA}}$ values yields the value $$\sum_{A_{MA}} R_{A_{MA}}.$$

Since each staff member of the multi-activity MA is qualified for at least one activity $A_{MA}$ the case $K_{A_{MA}} = 0$ does not occur.

Course of Action

In order to achieve the attained adaptation of the staff member requirement of the multi-activity $N_{MA}$ after each optimization step which has as consequence a changing of the ratio of the qualified staff members per activity of a multi-activity (cf. equation 36), the approximation of the requirement per activity of a multi-activity $N_{A_{MA}}$ is calculated for each activity $A_{MA}$ and added up to give a new requirement of the multi-activity. For the new staff member requirement or a multi-activity it holds:

$$\sum_{A_{MA}} N_{A_{MA}} = N_{MA}. \qquad (40)$$

In this recalculation, as already mentioned, the checking of the capacities can be omitted. Under the assumption that after each significant optimization step the requirement of the multi-activity is recalculated, the total target function is in some of the embodiments of the 2$^{nd}$ variant:

$$\sum_t \left[ \sum_{A_N} \left( \frac{R_{A_N}(t) - S_{A_N}(t)}{R_{A_N}(t)} \right)^2 + \left( \frac{N_{MA}(t) - BOC_{MA}(t)}{N_{MA}(t)} \right)^2 \right] \to 0 \quad (41)$$

The removal of the checking of the capacities is, however, not stringently necessary since the adaptation of the requirement of the multi-activity is only carried out via an approximation. In order to allow for an increased measure of security with regard to the prevention of falling below the requirement of the individual activities of a multi-activity $A_{MA}$ the capacity checking, like in the 1$^{st}$ variant, can be used. The following target function arises for some of the embodiments of the 2$^{nd}$ variant:

$$\sum_t \left[ \sum_{A_N} \left( \frac{R_{A_N}(t) - S_{A_N}(t)}{R_{A_N}(t)} \right)^2 + \left( \frac{N_{MA}(t) - BOC_{MA}(t)}{N_{MA}(t)} \right)^2 + \sum_{A_{MA}} \left( \frac{R_{A_{MA}}(t) - C_{A_{MA}}(t)}{R_{A_{MA}}(t)} \right)^2 \right] \to 0 \quad (42)$$

As already mentioned in the context of the 1$^{st}$ variant the following has to be noted in the third term with regard to the sub-activities $A_{MA}$: the realm of the expression which refers to the sub-activities is only then involved in this calculation for those sub-activities $A_{MA}$ for which the condition $C_{A_{MA}}(t) \geq R_{A_{MA}}(t)$ is not met, otherwise the corresponding sub-activity $A_{MA}$ is not considered and enters into the third term with the value "0".

Embodiments of both variants of the optimization procedure are now illustrated by example of the figures.

FIG. 1 shows an exemplary staff member requirement plan over a time period of one hour. The time period is subdivided into four shorter time intervals of 15 minutes each. Here the activities are, as usual in the context of call center application, different types of telephone calls. In this example, there are four different types of telephone calls A, B, C and D, whereby the processing of the telephone call types A, B and C is merged into a multi-activity and the handling of the telephone call type D is regarded as a normal activity. The staff member requirement figures (activity staff member requirements) which are indicated immediately above the bar relate to the case that each staff member possesses only a single qualification while the requirement figures indicated above the curly braces relate to the total staff member requirement of the multi-activity under the assumption that all staff members are qualified for all activities of the multi-activities. The staff member requirements in FIG. 1 are calculated by means of the equations (5)-(9) from a working volume and a desired service level. The total staff member requirement of the multi-activity is determined by means of equation (10). In the example of FIG. 1, the staff member requirement increases continuously within this hour (8:00-9:00 in the morning) as can frequently be observed in call centers.

FIG. 2 illustrates an example of which multiple qualifications the staff members possess. In the embodiment described, the staff members can be divided into three different qualification groups. In qualification group I, there are staff members who can handle the call types A, B and D. Among the given staff members, 10 persons possess this combination of qualifications, a part of which is exemplarily represented in the form of personnel members in the right column. 15 staff members belong to qualification group II; they all only possess one single qualification and can only handle calls of type B. 13 staff members who are qualified for call types C and D are assigned to qualification group III, and 16 staff members of qualification group IV can be assigned to the processing of the call types A, C and E. Of course, further combinations of qualifications are possible, but they do not occur in the example of FIG. 2. A staff member, namely the one with the personnel number 1712 from the qualification group is particularly marked. This is to indicate that he, as shift supervisor, is not scheduled by the optimization procedure to normal and multi-activities but is scheduled manually to activities.

In FIG. 3 an exemplary staff member assignment and its assessment is depicted. When creating an optimized staff member plan, one departs from an initial plan which is gradually altered by the optimization procedure. It is now assumed that the shown assignment occurs during this optimization procedure and represents a current plan. A move in the sense of a test step is carried out on this plan and it is compared by means of an assessment function whether the move leads to an improved assignment or not. If the move entails an improvement, then the plan is changed according to the move. If the move entails a degradation, one usually keeps the original plan and tries another move. It is pointed out that it is also possible in some of the optimization procedures described above such as simulated annealing and taboo search, to adopt a worse assignment in order to escape a local minimum.

The upper table of FIG. 3 shows how many staff members are assigned in the current assignment from the respective qualification groups to the normal activity D. These staff members only work on the normal activity D, even if they possess further qualifications. In the first time interval, one staff member of the qualification group I and three staff members of the qualification group III are scheduled to a normal activity so that altogether four staff members are available for handling the normal activity D. It is pointed out that according to the staff member requirement of FIG. 1, however, five persons are necessary to handle the working volume. This discrepancy enters into the evaluation function in form of penalty points.

The lower table shows the current assignment in the realm of the multi-activity. In the first time interval three persons of qualification group I, one person of qualification group II and four persons of qualification group III are assigned to the multi-activity. It is pointed out that the person with the personnel number 1712 is scheduled manually to all four time intervals as a shift supervisor. This assignment which is manually done is not changed by the optimization procedure. Below the table of the multi-activity, it is indicated how many capacities in the sense of equation 15 are available for handling the individual activities by means of the given assignment. In the first time interval, four persons are qualified for receiving call type A, five persons may answer call type B and four persons are available for call type C. For the purpose of simplification no difference is made when indicating the capacities if a person possesses a single qualification and is therefore completely available for the handling of a call type, or if a staff member is available in the context of a multiple qualification for a call type and is therefore only among other things available for the processing of this call type. The total number of persons assigned to a multi-activity, denoted by $BOC_{MA}$, is smaller than the sum of the capacities of the sub-activities since the persons possess multiple qualifications.

Below the indicated capacities, the value of the target function is indicated (equation 31) calculated for each time interval, as used in the $1^{st}$ variant. It is pointed out that in the time intervals 1-3 the $3^{rd}$ term of the target function (equation 31) has the value zero, since the sub-activities of the multi-activity are covered by the capacities. In the fourth time interval the requirements of none of the sub-activities are sufficiently covered so that the $3^{rd}$ term of the target function assesses these discrepancies with penalty points. The assignment as a whole is evaluated with the sum of the assessments of the time intervals, whereby in this case an evaluation of 0.732 arises.

Departing from the first assignment in FIG. 3, FIG. 4 shows a second assignment which emerges from the first assignment by additionally assigning a staff member of the qualification group I in the realm of normal activities in the first time interval. In the realm of the multi-activity, a staff member of the qualification group I is removed in the first and second time interval, in the third time interval a staff member of the qualification group II is drawn off and in the fourth time interval a staff member of qualification group III is additionally scheduled. This move leads to new capacities which are indicated below the multi-activity table. On the basis of these new capacities, now an evaluation by means of the target function takes place. If the target function (equation 31) should evaluate the new assignment with a lower value than the original assignment, the move is indeed executed. If a higher value should arise, the test step is rejected and, departing from the $1^{st}$ assignment, another test step is performed and another assignment is tried out.

It is noticeable that in the second assignment in the realm of the normal activity the discrepancy between the staff member requirement and the assigned staff members has disappeared due to the assignment of a further staff member in the first time interval. The target function does not assign any penalty points since the requirement and the staff members available match exactly. In the realm of the multi-activity, one may perceive that although in the time intervals 1-3 fewer staff members are scheduled, the staff member requirements of the sub-activities are still sufficiently covered. Therefore no penalty points are assigned for it. In fact in the time intervals 1-3 the number of the scheduled staff members to a multi-activity has been reduced by one, so that the $BOC_{MA}$ values are closer to the $R_{MA}$ values, which leads to a reduction of penalty points in the $2^{nd}$ term of the target function. In the fourth time interval, despite the assignment of a further staff member, the staff member requirements are not covered. However, at least the call type C is now better covered which leads to a reduction of the penalty points by the $3^{rd}$ term of the target function (equation 31). In fact, the value of the variable $BOC_{MA}$ has departed by one from the $R_{MA}$ value so that thereby the penalty points have increased. If one compares the two evaluations of the $3^{rd}$ time interval, one sees that the better coverage of the call type C leads to a stronger reduction of penalty points than are added by the departure from the $R_{MA}$ value. If one also considers the other time intervals, one sees that there, too, improvements have been achieved. Considering all in all, the second assignment is evaluated as of higher quality by the target function than the first assignment so that the move is not discarded but is indeed executed in the plan.

FIG. 5 shows a deployment plan which distributes individual staff members according to the second assignment to the individual time intervals. This assignment of staff members may be performed by the optimization procedure itself or the individual staff members assign themselves to a time interval according to the qualification group they belong to.

FIG. 6 shows calculations of the second variant of the procedure (applied to the first and second assignment) using equation 39. For each time interval, an effective staff member requirement $N_{MA}$ is calculated by means of the given qualifications. The effective staff member requirement is a sum of the approximation of the effective staff member requirements of the sub-activities. The assessment of the assignment is performed in the second variant by means of a target function (equation 41) whose first term considers the coverage of the staff members of the normal activities, and the second term compares the approximated staff member requirements with the total number of staff members who are assigned to the multi-activity. A checking of the coverage of the staff member requirements of the sub-activities is not provided but can be performed additionally according to equation 41. Like the first variant, the second variant assesses the second assignment with a lesser value than the first assignment so that this move is indeed performed in the plan when choosing the second variant.

Figure 7:
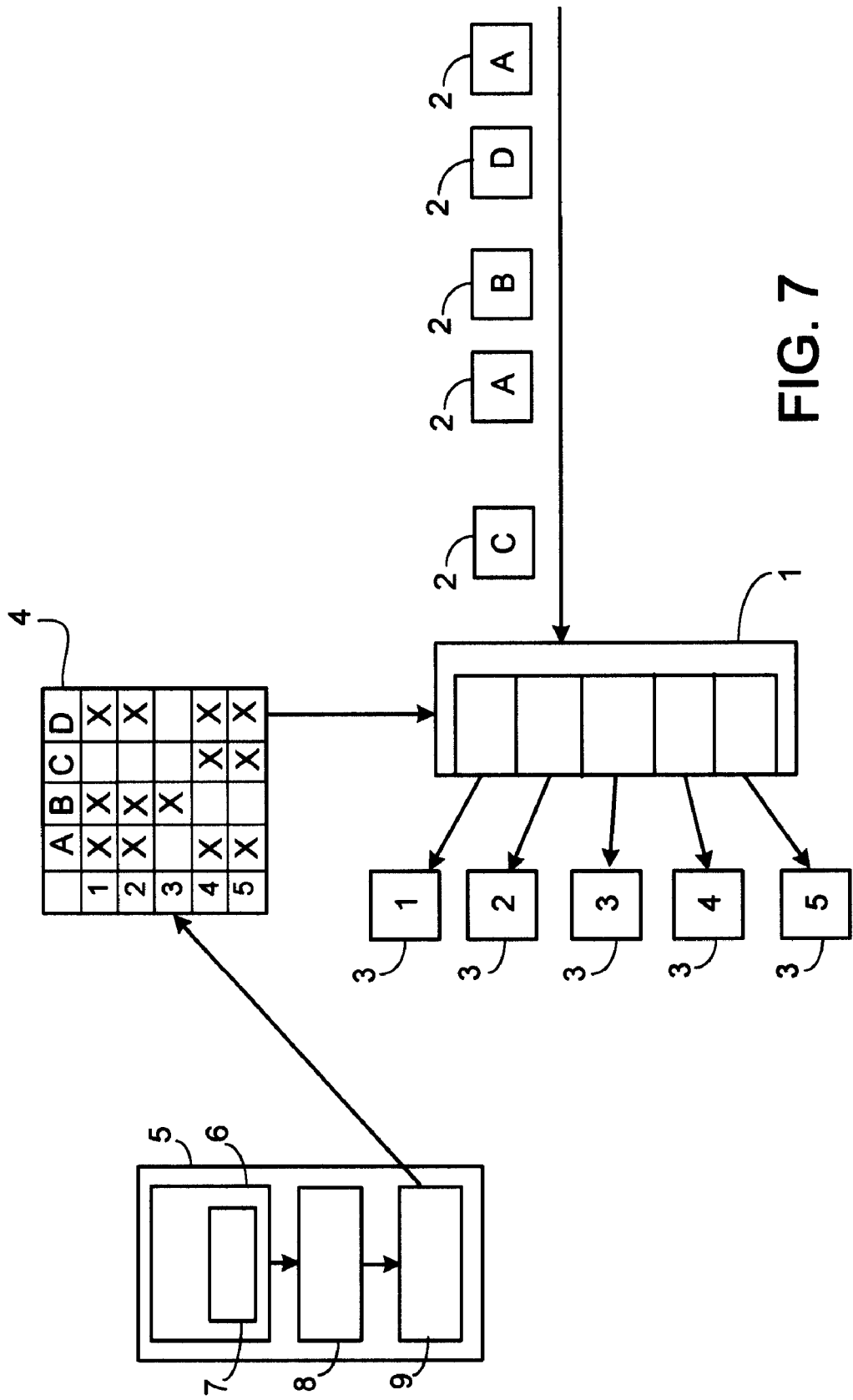
FIG. 7 is a schematic of an exemplary embodiment of a telephone call router which forwards incoming telephone calls to work places according to the required qualifications.

FIG. 7 schematically shows a telephone call router 1 which forwards incoming calls 2 according to their call type to staff member work places 3. In order to be able to handle this task, the telephone call router 1 has access to a qualification plan 4, which indicates which qualification for handling a call type is available, for each point of time and at which work place. The qualification plan 4 is based on a generated deployment plan 8 (cf. FIG. 5) which is created under usage of the described optimization procedure by an optimization module 6, which runs on a computer 5. The optimization module further possesses a target function (equations 31, 41, 42) as they are described above. For generating a qualification plan 4 from the deployment plan 8 a table 9 is provided which indicates which staff member is at which work place.

Figure 8:
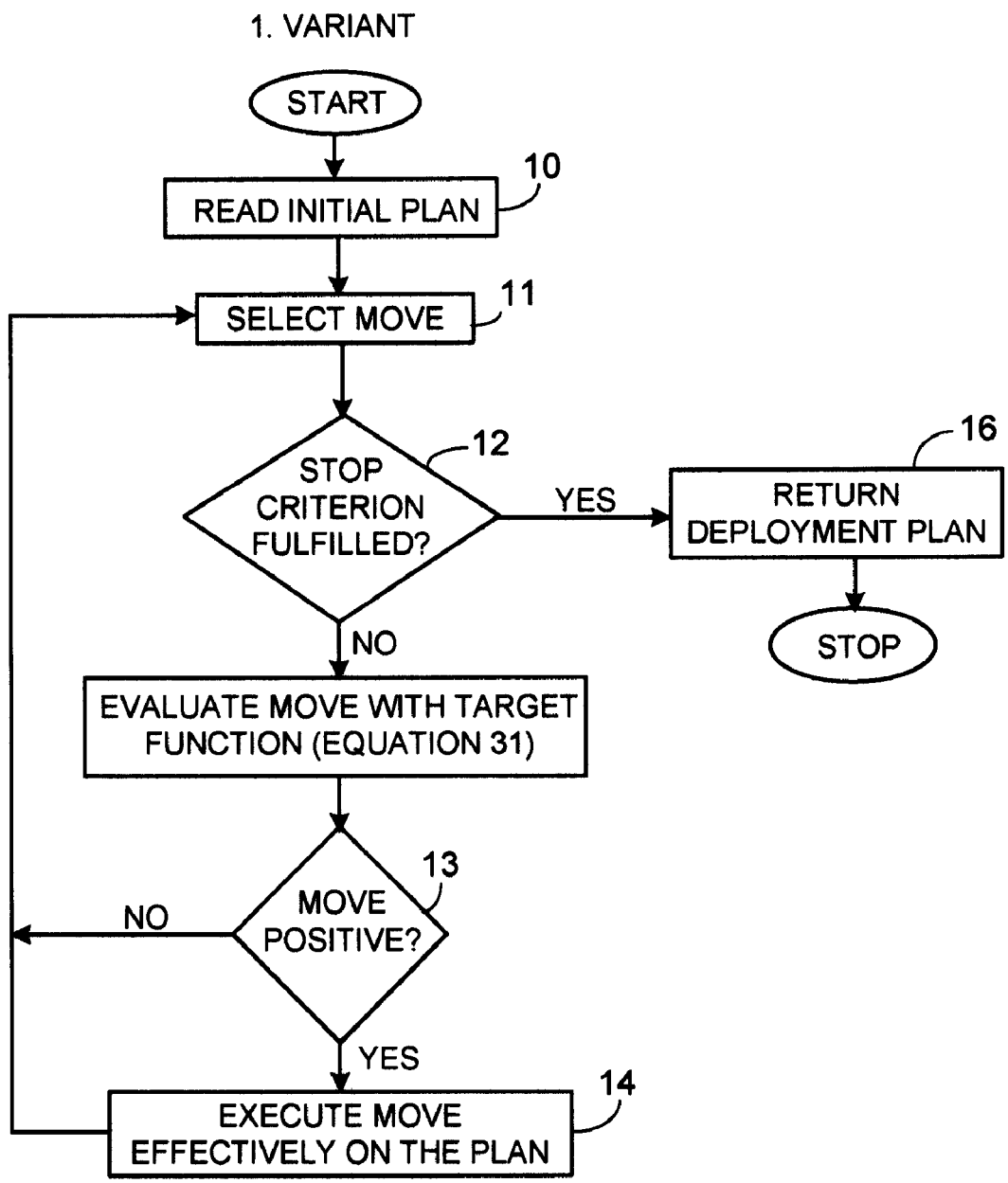
FIG. 8 is a flowchart of an exemplary embodiment of the first variant of the optimization procedure.

FIG. 8 shows a flowchart of the optimization procedure according to the first variant. At first, an initial plan is read in 10. This plan represents a staff member assignment which is to be optimized. At 11 this plan is changed by executing a move, i.e. further staff members are scheduled to individual time intervals, or staff members are removed from individual time intervals and are assigned to new time intervals and/or activities. At 12, it is checked whether a stop criterion is fulfilled. A stop criterion is a condition which is fulfilled if a certain number of optimization steps has been run through or if no move leads to any improvement. If a stop criterion is fulfilled, at 16 the current assignment is returned as the deployment plan. If the stop criterion is not fulfilled, the assignment which was created by the last move is assessed at 13 by means, for example, of equation 31 and at 14, it is checked whether the target function assesses this new assignment to be of higher quality than the original assignment. If the new assignment is assessed to be worse than the original assignment, the move is not performed in the plan normally (possibly different for example in the context of taboo search or simulated annealing), but another move is selected at 11. If the new assignment which has come into being at 13 is assessed to be of higher quality by the target function than the original assignment, at 14 the move is indeed performed in the plan and a new move is selected at 11. This iteration is run through until the stop criterion is fulfilled at 12.

Figure 9:
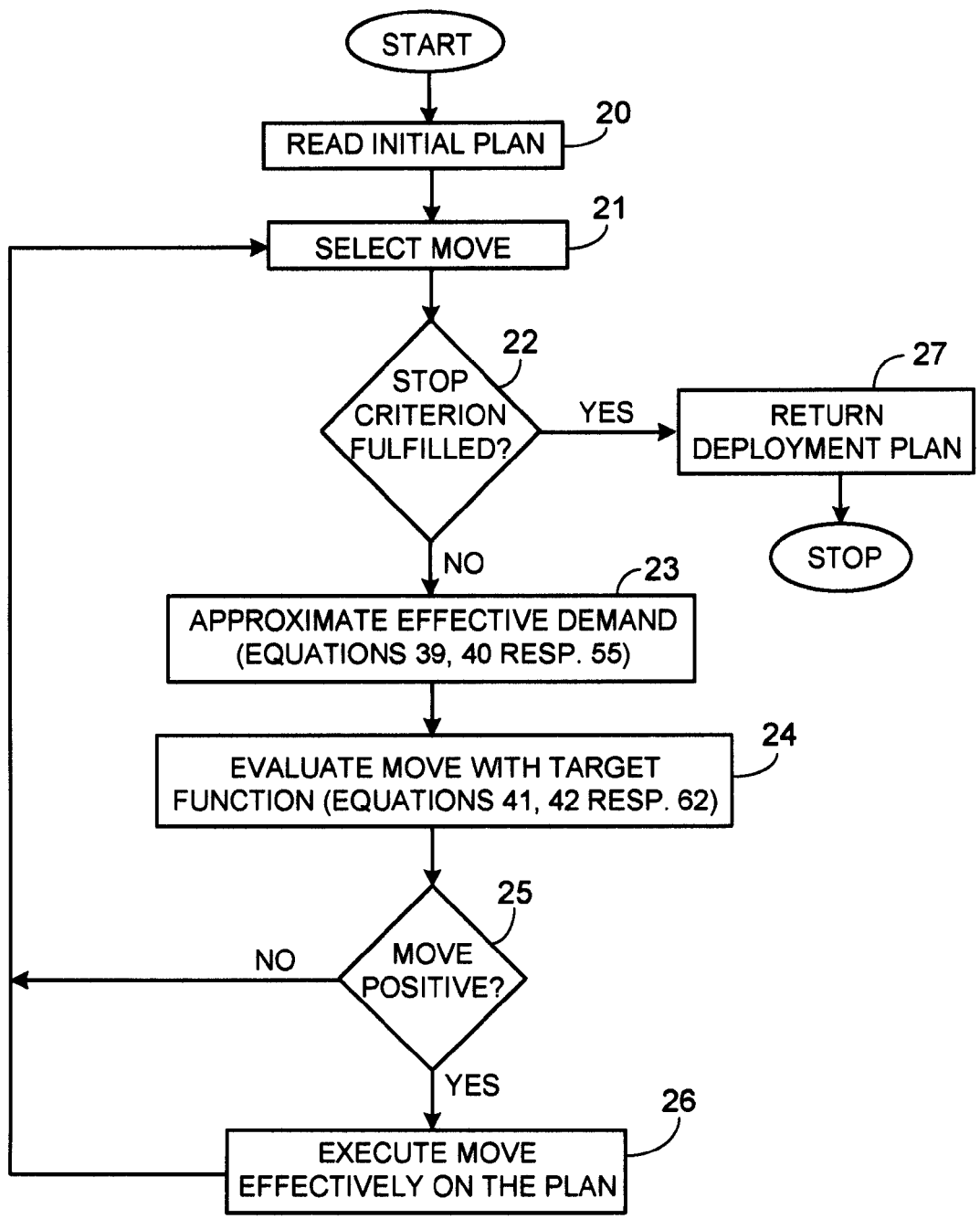
FIG. 9 is a flowchart of an exemplary embodiment of the second variant of the optimization procedure.

FIG. 9 shows a flowchart of the optimization procedure according to the second variant. At 20, an initial plan is read which is to be optimized. At 21, a move is selected, and at 22 a check is made whether a criterion is fulfilled. If the stop criterion is fulfilled, at 27 the current assignment is returned as a deployment plan. If the stop criterion is not fulfilled an effective requirement of a multi-activity is calculated at 23 by means of the assignment performed by the move by means of, for example, an approximation formula (equation 39, 40). At 24, this effective requirement is compared in a target function (equation 41, 42) with the number of staff members altogether assigned to the multi-activity. Furthermore, a term enters into the target function which considers the coverage of normal activities. If, at 25, the assignment arrived at by the performed move is assessed to be better by the target function than the original assignment, at 26 the move is performed effectively in the plan. If the assignment represents a degradation, the move is not performed but at 21 a new move is selected. This iteration is run through until the stop criterion is fulfilled at 22.

Figure 10:
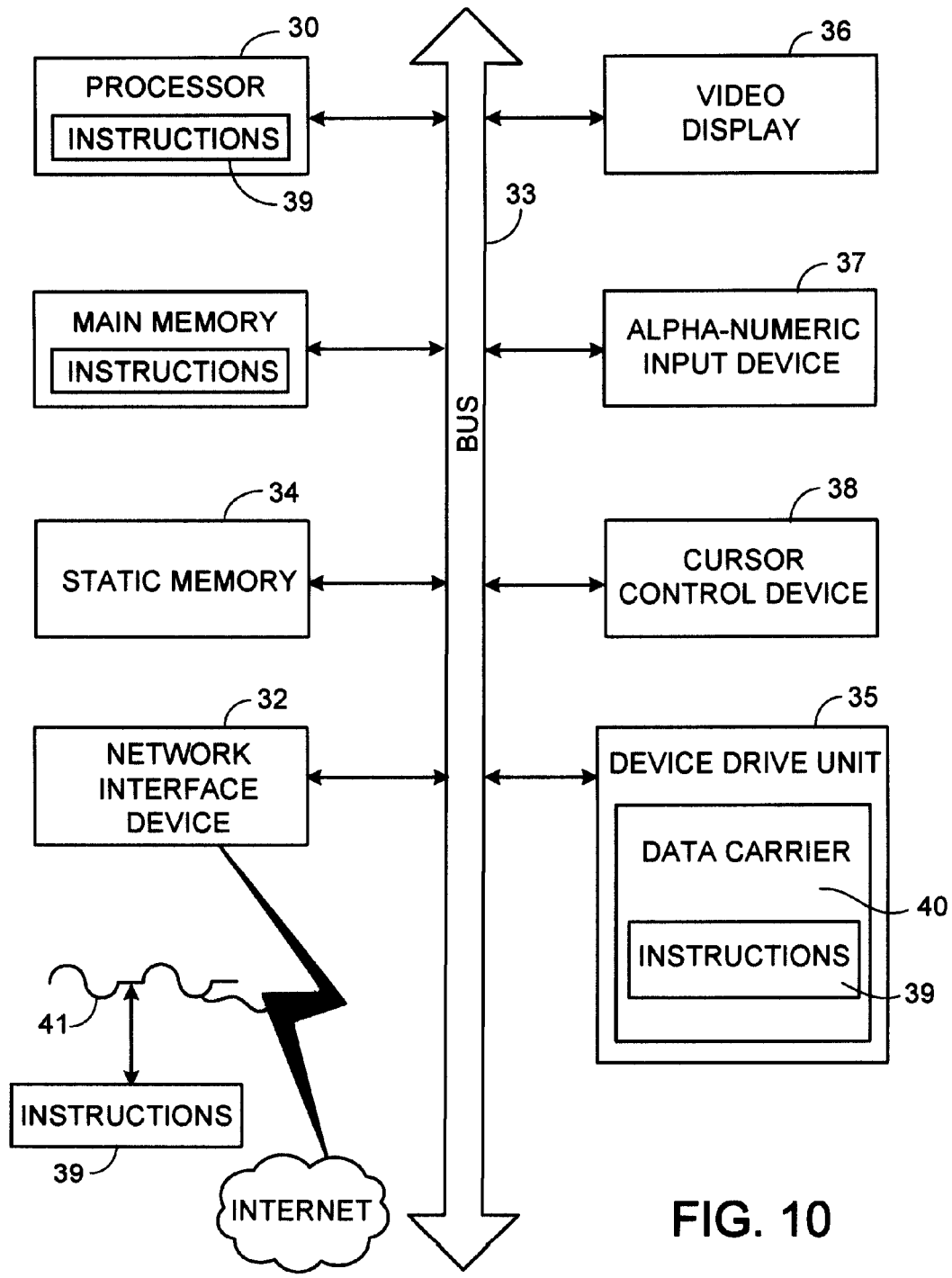
FIG. 10 is a diagrammatic representation of an exemplary embodiment of an optimization computer system, according to embodiments of the invention.

FIG. 10 is a diagrammatic representation of a computer system which provides the functionality of the computer 5 with the optimization module 6 of FIG. 7, and is therefore denoted as "optimization computer system" 5. Within the optimization computer system 5 a set of instructions, for causing the computer system to perform any of the methodologies discussed herein, may be executed. The optimization computer system includes a processor 30, a main memory 31 and a network interface device 32, which communicate with each other via a bus 33. Optionally, it may further include a static memory 34 and a disk drive unit 35. A video display 36, an alpha-numeric input device 37 and a cursor control device 38 may form an optimization computer system user interface. The network interface device 32 connects the optimization computer system user interface to the Internet. A set of instructions (i.e. software) 39 embodying any one, or all, of the methodologies described above, resides completely, or at least partially, in or on a machine-readable medium, e.g., the main memory 31 and/or the processor 30. A machine-readable medium on which the software 39 resides may also be a data carrier 40 (e.g., a non-removable magnetic hard disk or an optical or magnetic removable disk) which is part of disk drive unit 35. The software 39 may further be transmitted or received as a propagated signal 41 via the Internet and the IT network through the network interface device 32.

By means of the described embodiments the individual move may be performed in the optimization with relatively few calculation operations, so that in the time which is available for an optimization, which is typically limited, a relatively large number of moves can be tried out. Consequently, a good optimization result is quickly obtained, and furthermore, with a given permanent staff of a call center, an improved service level (e.g., less waiting time) is obtained when operating the call center.

All publications and existing systems mentioned in this specification are herein incorporated by reference.

OTHER EMBODIMENTS

The methods and systems described herein are not limited to a particular hardware or software configuration, and may find applicability in many computing or processing environments. The methods and systems can be implemented in hardware, or a combination of hardware and software, and/or can be implemented from commercially available modules applications and devices. Where the implementation of the systems and methods described herein is at least partly based on use of microprocessors, the methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor," "a processor" and "a processor-based machine", or "the microprocessor," "the processor" and "a processor-based machine" and can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

Although certain methods and products constructed in accordance with the teachings of the inventions have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of causing a particular computer system to create a deployment plan for staff members with single or multiple qualifications for performing activities, each activity requiring at least a single qualification, the method comprising:

repeatedly generating, by a processor associated with the particular computer system, a deployment plan assignment of the staff members, and assessing a quality of the assignment generated regarding the state of coverage of activities by using a target function, using, by a processor associated with the particular computer system, one of the assignments on the basis of the assessment of the quality as the assignment representing the deployment plan, wherein the target function comprises a normal-activity term:

$$\left(\frac{R_{A_N}(t) - S_{A_N}(t)}{R_{A_N}(t)}\right)^2$$

and a multi-activity term:

$$\left(\frac{R_{MA}(t) - BOC_{MA}(t)}{R_{MA}(t)}\right)^2$$

wherein the normal-activity term and the multi-activity term are combined to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 \right),$$

wherein a longer time interval of the deployment plan assignment is divided into shorter time intervals t,
where $A_N$ refers to a normal activity, $R_{A_N}(t)$ is the staff member requirement for a normal activity and $S_{A_N}(t)$ is the number of staff members that have been scheduled to the activity $A_N$,
MA refers to a multi-activity which is a thought bundling of activities to which staff members with single or multiple qualifications are assigned, $R_{MA}(t)$ is the staff member requirement for the multi-activity MA under the assumption that each of the staff members deployed to the multi-activity MA is qualified for all the activities of the multi-activity MA due to his/her multiple qualification, and $BOC_{MA}(t)$ is the number of staff members that have been scheduled at the point of time t to the multi-activity MA or to an activity of the multi-activity MA, and
maximizing the coverage of activities by minimizing the target function.

2. The method according to claim 1,
wherein for each activity an activity staff member requirement is calculated that indicates how many staff members are needed, if each of the staff members deployed is only qualified for one activity,
and wherein the target function comprises a further term $$\sum_{A_{MA}} \left( \frac{R_{A_{MA}}(t) - C_{A_{MA}}(t)}{R_{A_{MA}}(t)} \right)^2,$$

wherein the further term is combined with the normal-activity term and the multi-activity term to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 + \sum_{A_{MA}} \left( \frac{R_{A_{MA}}(t) - C_{A_{MA}}(t)}{R_{A_{MA}}(t)} \right)^2 \right)$$

where $R_{A_{MA}}(t)$ is the staff member requirement of an activity $A_{MA}$ of the multi-activity MA, and
$C_{A_{MA}}(t)$ is the number of staff members assigned to a multi-activity MA that can take over the activity $A_{MA}$.

3. The method according to claim 1, wherein the deployment plan assignment of the staff members is performed for each of the shorter time intervals and the target function adds up the assessments of the shorter time intervals for the assessment of the deployment plan assignment.

4. The method according to claim 1, wherein staff members are deployed to activities within a multi-activity prior to commencement of creating the deployment plan.

5. The method according to claim 1, wherein a scheduler generates the deployment plan assignments under boundary conditions in the context of an optimization procedure.

6. The method according to claim 5, wherein the optimization procedure includes at least one of: a taboo-search procedure, a simulated annealing procedure, a hill-climbing procedure, a genetic algorithm procedure, and a branch-and-bound procedure.

7. A method of configuring a particular telephone call router with the aid of a particular computer system and on the basis of a deployment plan prepared for staff members with single or multiple qualifications for performing activities, each activity requiring at least a single qualification, the method comprising:
repeatedly generating, by a processor associated with the particular computer system, a deployment plan assignment of the staff members, and assessing, by a processor associated with the particular computer system, a quality of the assignment generated regarding the state of coverage of activities using a target function,
using, by a processor associated with the particular computer system, one of the assignments on the basis of the assessment of the quality as the assignment representing the deployment plan,
wherein the target function comprises a normal-activity term $$\left( \frac{R_{A_N}(t) - S_{A_N}(t)}{R_{A_N}(t)} \right)^2$$

and a multi-activity term:

$$\left( \frac{R_{MA}(t) - BOC_{MA}(t)}{R_{MA}(t)} \right)^2$$

wherein the normal-activity term and the multi-activity term are combined to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 \right),$$

wherein a longer time interval of the deployment plan assignment is divided into shorter time intervals t,
where $A_N$ refers to a normal activity, $R_{A_N}(t)$ is the staff member requirement for a normal activity and $S_{A_N}(t)$ is the number of staff members that have been scheduled to the activity $A_N$,
MA refers to a multi-activity which is a thought bundling of activities to which staff members with single or multiple qualifications are assigned, $R_{MA}(t)$ is the staff member requirement for the multi-activity under the assumption that each of the staff members deployed to the multi-activity is qualified for all the activities of the multi-activity due to his/her multiple qualification, and $BOC_{MA}(t)$ is the number of staff members that have been scheduled at the point of time t to the multi-activity MA or to an activity of the multi-activity MA,
maximizing the coverage of activities by minimizing the target function, and
configuring, using a processor associated with a particular computer system, the telephone call router so that the telephone call router forwards telephone calls to one or more staff members, who are in service according to the deployment plan at the point of time of the telephone call, wherein the one or more staff members have the qualifications to answer the telephone calls.

8. The method according to claim 7, wherein for each activity an activity staff member requirement is calculated that indicates how many staff members are needed, if each of the staff members deployed is only qualified for one activity, and wherein the target function comprises a further term $$\sum_{A_{MA}} \left( \frac{R_{A_{MA}}(t) - C_{A_{MA}}(t)}{R_{A_{MA}}(t)} \right)^2,$$

wherein the further term is combined with the normal-activity term and the multi-activity term to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 + \sum_{A_{MA}} \left( \frac{R_{A_{MA}}(t) - C_{A_{MA}}(t)}{R_{A_{MA}}(t)} \right)^2 \right)$$

where $R_{A_{MA}}(t)$ is the staff member requirement of an activity $A_{MA}$ of the multi-activity MA, and $C_{A_{MA}}(t)$ is the number of staff members assigned to a multi-activity MA that can take over the activity $A_{MA}$.

9. A computer program product comprising software for creating a deployment plan for staff members with single or multiple qualifications for performing activities, the software being stored on a non-transitory machine-readable medium, wherein the software includes computer instructions that, when executed on a processor-based machine, cause the processor-based machine to:
repeatedly generate a deployment plan assignment of the staff members, and assess a quality of the assignment generated regarding the state of coverage of activities by using a target function,
use one of the assignments on the basis of the assessment of the quality as the assignment representing the deployment plan,
wherein the target function comprises a normal-activity term:

$$\left( \frac{R_{A_N}(t) - S_{A_N}(t)}{R_{A_N}(t)} \right)^2$$

and a multi-activity term:

$$\left( \frac{R_{MA}(t) - BOC_{MA}(t)}{R_{MA}(t)} \right)^2$$

wherein the normal-activity term and the multi-activity term are combined to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 \right),$$

wherein a longer time interval of the deployment plan assignment is divided into shorter time intervals t,
where $A_N$ refers to a normal activity, $R_{A_N}(t)$ is the staff member requirement for a normal activity and $S_{A_N}(t)$ is the number of staff members that have been scheduled to the activity $A_N$,
MA refers to a multi-activity which is a thought bundling of activities to which staff members with single or multiple qualifications are assigned, $R_{MA}(t)$ is the staff member requirement for the multi-activity under the assumption that each of the staff members deployed to the multi-activity is qualified for all the activities of the multi-activity due to his/her multiple qualification, and $BOC_{MA}(t)$ is the number of staff members that have been scheduled at the point of time t to the multi-activity MA or to an activity of the multi-activity MA, and
maximizing the coverage of activities by minimizing the target function.

10. The computer program product according to claim 9, wherein for each activity an activity staff member requirement is calculated that indicates how many staff members are needed, if each of the staff members deployed is only qualified for one activity,
and wherein the target function comprises a further term $$\sum_{A_{MA}} \left( \frac{R_{A_{MA}}(t) - C_{A_{MA}}(t)}{R_{A_{MA}}(t)} \right)^2,$$

wherein the further term is combined with the normal-activity term and the multi-activity term to form the target function as follows:

$$\sum_t \left( \sum_{A_N} \left( \frac{R_{A_N}(t) - S_{A_N}(t)}{R_{A_N}(t)} \right)^2 + \left( \frac{R_{MA}(t) - BOC_{MA}(t)}{R_{MA}(t)} \right)^2 + \sum_{A_{MA}} \left( \frac{R_{A_{MA}}(t) - C_{A_{MA}}(t)}{R_{A_{MA}}(t)} \right)^2 \right)$$

where $R_{A_{MA}}(t)$ is the staff member requirement of an activity $A_{MA}$ of the multi-activity MA, and $C_{A_{MA}}(t)$ is the number of staff members assigned to a multi-activity that can take over the activity $A_{MA}$.

\* \* \* \* \*